(12) United States Patent
Mancilla et al.

(10) Patent No.: US 10,337,674 B2
(45) Date of Patent: *Jul. 2, 2019

(54) CONTROL SYSTEM IN A GAS PIPELINE NETWORK TO SATISFY PRESSURE CONSTRAINTS

(71) Applicant: Air Products and Chemicals, Inc., Allentown, PA (US)

(72) Inventors: Camilo Mancilla, Allentown, PA (US); Joshua David Isom, Allentown, PA (US); Ali Esmaili, Emmaus, PA (US); Suyash Singh, Annandale, NJ (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/864,464

(22) Filed: Jan. 8, 2018

(65) Prior Publication Data
US 2018/0299076 A1  Oct. 18, 2018

Related U.S. Application Data

(63) Continuation of application No. 15/490,268, filed on Apr. 18, 2017, now Pat. No. 9,897,259.

(51) Int. Cl.
*F17D 1/04* (2006.01)
*F17D 3/01* (2006.01)
(Continued)

(52) U.S. Cl.
CPC .............. *F17D 3/01* (2013.01); *F17D 1/04* (2013.01); *F17D 5/005* (2013.01); *G05D 7/0641* (2013.01)

(58) Field of Classification Search
None
See application file for complete search history.

(56) References Cited

U.S. PATENT DOCUMENTS

| 4,200,911 A | 4/1980 | Matsumoto |
| 4,835,687 A | 5/1989 | Martin |

(Continued)

OTHER PUBLICATIONS

C.M. Correa-Posada, et al, "Gas Network Optimization: A comparison of Piecewise Llinear Models", Chemical Engineering Science, 2014, 1-24.

(Continued)

*Primary Examiner* — Ryan A Jarrett
(74) *Attorney, Agent, or Firm* — Matthew R. Weaver

(57) ABSTRACT

Controlling flow of gas in a gas pipeline network, wherein flow within each pipeline segment is associated with a direction (positive or negative). Minimum and maximum signed flow rates are calculated for each pipeline segment constituting lower and upper bounds, respectively, for flow in each pipeline segment. A nonlinear pressure drop relationship is linearized within the lower and upper flow bounds to create a linear pressure drop model for each pipeline segment. A network flow solution is calculated, using the linear pressure drop model, and includes flow rates for each pipeline segment to satisfy demand constraints and pressures for each of a plurality of network nodes to satisfy pressure constraints. Lower and upper bounds on the pressure constraint comprise a minimum delivery pressure and a maximum operating pressure, respectively. The network flow solution is associated with control element setpoints used by a controller to control one or more control elements.

6 Claims, 32 Drawing Sheets

(51) Int. Cl.
*F17D 5/00* (2006.01)
*G05D 7/06* (2006.01)

(56) References Cited

U.S. PATENT DOCUMENTS

| | | |
|---|---|---|
| 6,236,894 B1 | 5/2001 | Stoisits et al. |
| 6,697,713 B2 | 2/2004 | Megan et al. |
| 6,701,223 B1 | 3/2004 | Rachford, Jr. et al. |
| 6,993,403 B1 | 1/2006 | Dadebo et al. |
| 7,561,928 B2 | 7/2009 | Peureux et al. |
| 7,720,575 B2 | 5/2010 | Ferber et al. |
| 8,762,291 B2 | 6/2014 | Neagu et al. |
| 9,599,499 B1 | 3/2017 | Chaudhary et al. |
| 9,890,908 B1 | 2/2018 | Esmaili et al. |
| 9,897,259 B1 * | 2/2018 | Mancilla .............. F17D 3/01 |
| 9,897,260 B1 | 2/2018 | Mancilla et al. |
| 9,915,399 B1 | 3/2018 | Latshaw et al. |
| 2003/0144766 A1 | 7/2003 | Megan et al. |
| 2003/0192693 A1 | 10/2003 | Wellington |
| 2005/0137810 A1 | 6/2005 | Esposito, Jr. et al. |
| 2005/0273204 A1 | 12/2005 | Hansen et al. |
| 2007/0204930 A1 | 9/2007 | Phallen et al. |
| 2007/0260333 A1 | 11/2007 | Peureux et al. |
| 2009/0265292 A1 | 10/2009 | Harper |
| 2010/0152900 A1 | 6/2010 | Gurciullo et al. |
| 2010/0174517 A1 | 7/2010 | Slupphaug et al. |
| 2010/0222911 A1 | 9/2010 | Castelijns et al. |
| 2013/0211601 A1 | 8/2013 | Cheng et al. |
| 2014/0005841 A1 | 1/2014 | Cheng et al. |
| 2015/0136248 A1 | 5/2015 | Nagase et al. |
| 2016/0072891 A1 | 3/2016 | Joshi et al. |
| 2016/0209851 A1 | 7/2016 | Aughton et al. |

OTHER PUBLICATIONS

A. Gopalakrishnan, et al, "Economic Nonlinear Model Predictive Control for periodic optimal operation of gas pipeline networks", Computers and Chemical Engineering, 2013, 52, 90-99.
F. Tabkhi, et al, "Improving the Performance of Natural Gas Pipeline Networks Fuel Consumption Minimization Problems", American Institute of Chemical Engineers, 2010, 56, 946-964.
R.Z. Rios-Mercado, et al, "Optimization problems in natural gas transportation systems: A state-of-the-art review", Applied Energy, 2015, 147, 536-555.
K.G. Murty, et al, "Some NP-Complete Problems in Quadratic and Nonlinear Programming", Mathematical Programming, 1987, 39, 117-129.
R.K. Ahuja, et al, "Network Flows, Chapter 4 Shortest Paths: Label-Setting Algorithms", 1993, 93-132.
Ajinkya A. More, et al, "Analytical solutions for the Colebrook and White equation and for pressure drop in ideal gas flow in pipes", Chemical Engineering Science, 2006, 61, 5515-5519.
Dejan Brkic, "Lambert W Function in Hydraulics Problems", Mathematica Balkanica, 2012, 26, 285-292.
U.S. Appl. No. 15/860,072, filed Jan. 2, 2018, first named inventor Ali Esmaili, titled Control System in a Gas Pipeline Network to Increase Capacity Factor.
U.S. Appl. No. 15/872,214, filed Jan. 16, 2018, first named inventor Joshua David Isom, titled Control System in an Industrial Gas Pipeline Network to Satisfy Energy Consumption Constraints at Production Plants.
Alexander Martin, et al, "Mixed Integer Models for the Stationary Case of Gas Network Optimization", Math. Program., 2006, 563-582.
A. Martin, et al, "A Mixed Integer Approach for the Transient Case of Gas Network Optimization", 2007.

* cited by examiner

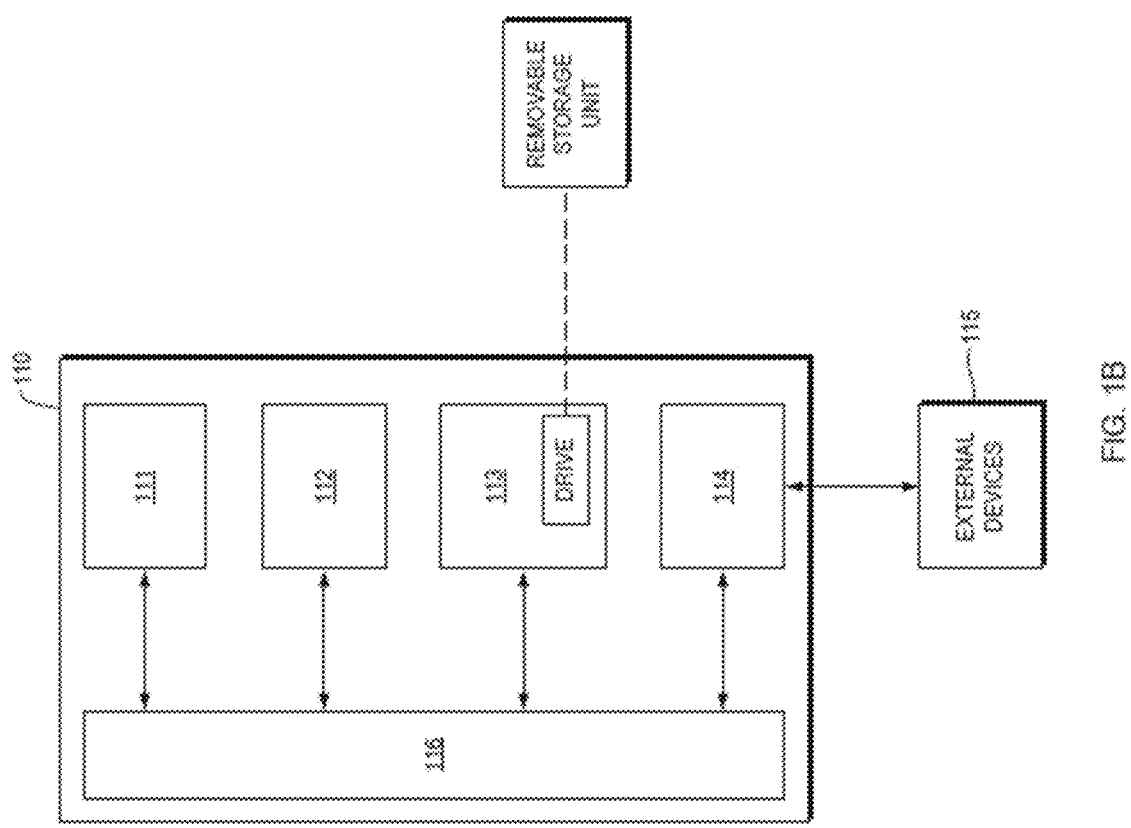

$d_{R_j}^{min} = \left(\sum_{n \in R} d_n\right) - \left(\sum_{n \in R} s_n^{max}\right) = (9 + 12 + 10 + 16) - (15 + 8 + 10 + 12) = 2$ $d_R^{max} = \left(\sum_{n \in R} d_n\right) - \left(\sum_{n \in R} s_n^{min}\right) = (9 + 12 + 10 + 16) - (10 + 7 + 3 + 5) = 22$ $d_1 = 9$ $s_{10}^{min} = 7$
$s_{10}^{max} = 12$ $q_j^{min} = \max\{s_{L_j}^{min}, d_{R_j}^{min}\} = \max\{7, 2\} = 7$ $q_j^{max} = \min\{s_{L_j}^{max}, d_{R_j}^{max}\} = \min\{12, 22\} = 12$ $s_{17}^{min} = 5$
$s_{17}^{max} = 10$ $s_{L_j}^{min} = \left(\sum_{n \in L} s_n^{min}\right) - \left(\sum_{n \in L} d_n\right) = (7) - (0) = 7$ $s_L^{max} = \left(\sum_{n \in L} s_n^{max}\right) - \left(\sum_{n \in L} d_n\right) = (12) - (0) = 12$ $s_{13}^{min} = 3$
$s_{13}^{max} = 8$ $s_2^{min} = 10$
$s_2^{max} = 15$ $d_9 = 12$ $d_{16} = 6$ $d_{12} = 10$

FIG. 6

$$s_{L_j}^{min} = \left(\sum_{n \in L} s_n^{min}\right) - \left(\sum_{n \in L} d_n\right) = (3 + 10 + 5) - (12 + 10 + 6) = -10$$

$$s_L^{max} = \left(\sum_{n \in L} s_n^{max}\right) - \left(\sum_{n \in L} d_n\right) = (15 + 8 + 10) - (12 + 10 + 6) = 5$$

$$d_{R_j}^{min} = \left(\sum_{n \in R} d_n\right) - \left(\sum_{n \in R} s_n^{max}\right) = (9) - (12) = -3$$

$$d_R^{max} = \left(\sum_{n \in R} d_n\right) - \left(\sum_{n \in R} s_n^{min}\right) = (9) - (7) = 2$$

$$q_j^{min} = \max\{s_{L_j}^{min}, d_{R_j}^{min}\} = \max\{-10, -3\} = -3$$

$$q_j^{max} = \min\{s_{L_j}^{max}, d_{R_j}^{max}\} = \min\{5, 2\} = 2$$

$d_1 = 9$ $s_{10}^{min} = 7$
$s_{10}^{max} = 12$ $s_{17}^{min} = 5$
$s_{17}^{max} = 10$ $s_{13}^{min} = 3$
$s_{13}^{max} = 8$ $s_2^{min} = 10$
$s_2^{max} = 15$ $d_9 = 12$ $d_{16} = 6$ $d_{12} = 10$

FIG. 7

CONTROL SYSTEM IN A GAS PIPELINE NETWORK TO SATISFY PRESSURE CONSTRAINTS

CROSS REFERENCE TO RELATED APPLICATIONS

This application is a continuation of, and claims the priority of, U.S. patent application Ser. No. 15/490,268 filed Apr. 18, 2017 (now issued as U.S. Pat. No. 9,897,259), which is incorporated by reference herein in its entirety.

FIELD OF THE INVENTION

The invention relates to the control of gas pipeline networks for the production, transmission, and distribution of a gas.

BRIEF SUMMARY OF THE INVENTION

The present invention involves a system and method for controlling flow of gas in a gas pipeline network. The gas pipeline network includes a gas production plant, a gas receipt facility of a customer, a plurality of pipeline segments, a plurality of network nodes, and a plurality of control elements. Flow of gas within each of the plurality of pipeline segments is associated with a direction, the direction being associated with a positive sign or a negative sign. The system also includes one or more controllers and one or more processors. A minimum signed flow rate and a maximum signed flow rate is calculated for each pipeline segment. The minimum signed flow rate constitutes a lower bound for flow in each pipeline segment and the maximum signed flow rate constitutes an upper bound for flow in each pipeline segment. A nonlinear pressure drop relationship is linearized within the lower bound for the flow and the upper bound for the flow to create a linear pressure drop model for each pipeline segment. A network flow solution is calculated, using the linear pressure drop model. The network flow solution includes flow rates for each of the plurality of pipeline segments to satisfy demand constraints and pressures for each of the plurality of network nodes to satisfy pressure constraints. A lower bound on the pressure constraint comprises a minimum delivery pressure and an upper bound on the pressure constraint comprises a maximum operating pressure of the pipeline. The network flow solution is associated with control element setpoints. The controller(s) receives data describing the control element setpoints and controls at least some of the plurality of control elements using the data describing the control element setpoints.

In some embodiments, the processor is further configured to calculate the minimum signed flow rate and the maximum signed flow rate by: bisecting an undirected graph representing the gas pipeline network using at least one of the plurality of pipeline segments to create a left subgraph and right subgraph; calculating a minimum undersupply in the left subgraph by subtracting a sum of demand rates for each of the gas receipt facilities in the left subgraph from a sum of minimum production rates for each of the gas production plants in the left subgraph; calculating a minimum unmet demand in the right subgraph by subtracting a sum of maximum production rates for each of the gas production plants in the right subgraph from a sum of demand rates for each of the gas receipt facilities in the right subgraph; calculating the minimum signed flow rate for at least one of the pipeline segments as a maximum of a minimum undersupply in the left subgraph and a minimum unmet demand in the right subgraph; calculating a maximum oversupply in the left subgraph by subtracting the sum of the demand rates for each of the gas receipt facilities in the left subgraph from the sum of the maximum production rates for each of the gas production plants in the left subgraph; calculating a maximum unmet demand in the right subgraph by subtracting a sum of the minimum production rates for each of the gas production plants in the right subgraph from the sum of the demand rates for each of the gas receipt facilities in the right subgraph; and calculating the maximum signed flow rate for at least one of the pipeline segments as a minimum of a maximum oversupply in the left subgraph and a maximum unmet demand in the right subgraph.

In some embodiments, an error in pressure prediction for each of the plurality of network nodes is bounded and the bounds are used to ensure that the network flow solution produced using the linearized pressure drop model satisfies pressure constraints when a nonlinear pressure drop model is used.

In other embodiments, the error in pressure prediction for each of the plurality of network nodes is calculated as an upper bound on an absolute error associated with a reference node plus a shortest path distance between the network node and the reference node, and a distance between the network node and the reference node is a sum of the maximum squared pressure drop prediction error over edges in a path between the network node and a reference node.

In some embodiments, the linear pressure drop model for one of the pipeline segments is a least-squares fit of the nonlinear pressure drop relationship within a minimum and a maximum flow range for the segment.

In some embodiments, a slope-intercept model is used if the allowable flow range does not include a zero flow condition and a slope-only model is used if the allowable flow range does include a zero flow condition.

In some embodiments, a linear program is used to create the network flow solution.

In some embodiments, the control element comprises a steam methane reformer plant.

The flow control element may comprise an air separation unit; a compressor system; and/or a valve.

BACKGROUND

Gas pipeline networks have tremendous economic importance. As of September 2016, there were more than 2,700,000 km of natural gas pipelines and more than 4,500 km of hydrogen pipelines worldwide. In the United States in 2015, natural gas delivered by pipeline networks accounted for 29% of total primary energy consumption in the country. Due to the great importance of gas pipelines worldwide, there have been attempts to develop methods for calculating network flow solutions for gas pipeline networks. Some solutions involve formulating the problem as a nonconvex, nonlinear program. However, such methods cannot effectively scale for large gas pipeline networks. Other approaches involve stipulating in advance the direction of the flow in each pipeline segment. This approach has the advantage of reducing the complexity of the optimization problem.

However, not allowing for flow reversals severely restricts the practical application. Still other approaches formulate the solution as a mixed-integer linear program. However, constructing efficient mixed-integer linear program formulations is a significant task as certain attributes can significantly reduce the solver effectiveness.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings:

FIG. 1B illustrates an exemplary processing unit in accordance with an exemplary embodiment of the present invention.

FIG. 6 is a second example of the bisection method for bounding flows in pipes.

FIG. 7 is a third example illustrating the network bisection method.

DETAILED DESCRIPTION OF THE EXEMPLARY EMBODIMENTS

The invention relates to the control of gas pipeline networks for the production, transmission, and distribution of a gas. Examples of gas pipeline networks include 1) natural gas gathering, transmission, and distribution pipeline networks; 2) pipeline networks for the production, transmission, and distribution of hydrogen, carbon monoxide, or syngas; 3) pipeline networks for the production, transmission, and distribution of an atmospheric gas.

In gas pipeline networks, flow through the network is driven by pressure gradients wherein gas flows from higher pressure regions to lower pressure regions. As a gas travels through a pipeline network, the pressure decreases due to frictional losses. The greater the flow of gas through a particular pipeline segment, the greater the pressure drop through that segment.

Gas pipeline networks have certain constraints on the pressure of the gas within the network. These include lower bounds on the pressure of a gas delivered to a customer, and upper bounds on the pressure of a gas flowing through a pipeline. It is desirable for the operator of a gas pipeline network to meet pressure constraints. If upper limits on pressure are not satisfied, vent valves may open to release gas from the network to the atmosphere. If lower bounds on the pressure of gas supplied to a customer are not met, there may be contractual penalties for the operator of the gas pipeline network.

Figure 1A:
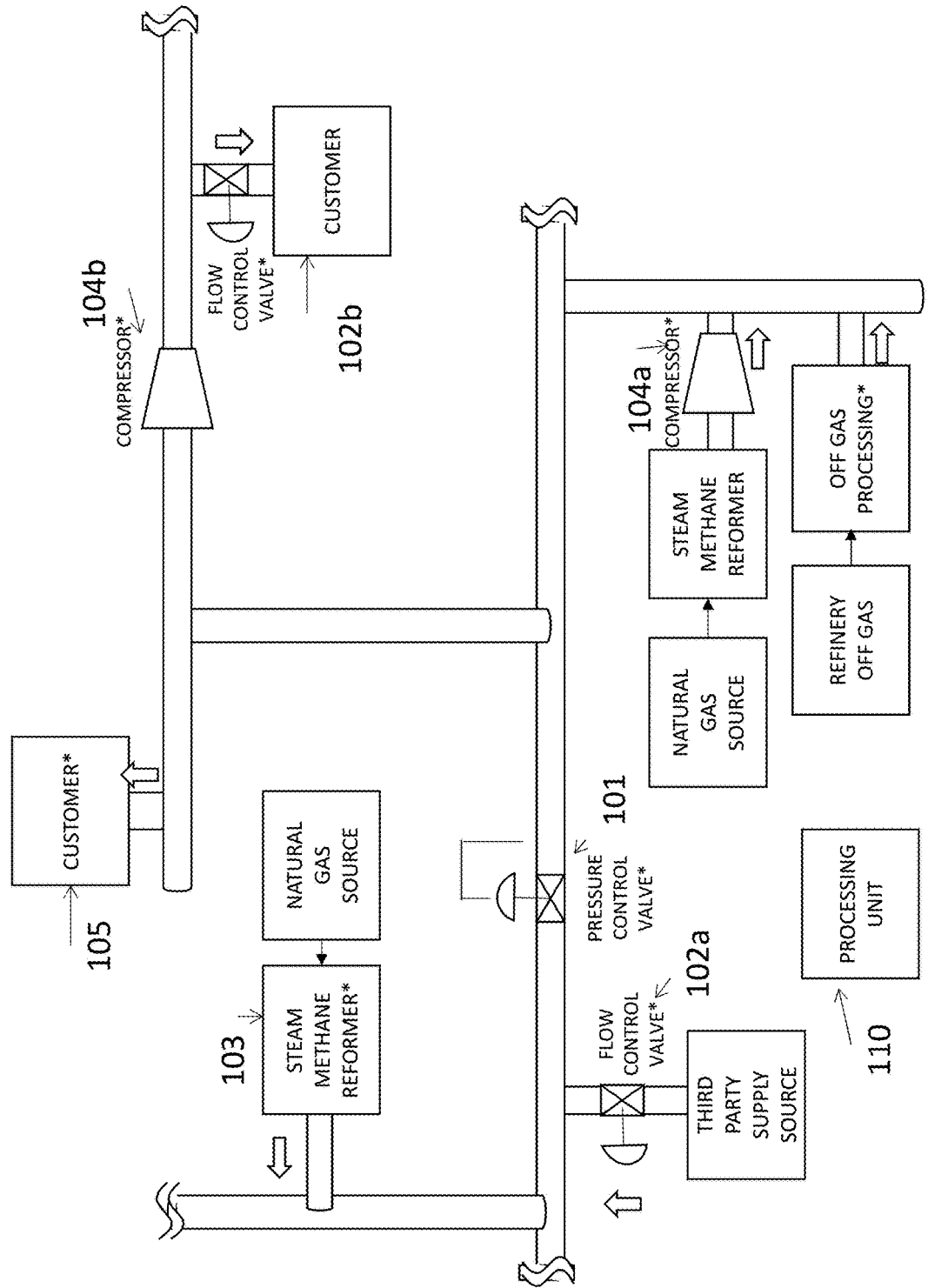
FIG. 1A illustrates an exemplary gas pipeline network.

To meet constraints on flows delivered to customers, and pressures within the network, gas pipeline networks include control elements which are operable to regulate pressure and flow. FIG. 1A illustrates an exemplary hydrogen gas pipeline network. This exemplary network illustrates at least certain of the physical elements that are controlled in accordance with embodiments of the present invention. Flow control elements are operable to receive setpoints for the flow or pressure of gas at a certain location in the network, and use feedback control to approximately meet the setpoint. Thus, control elements include pressure control elements 101 and flow control elements 102a, 102b.

Industrial gas production plants associated with a gas pipeline network are control elements, because they are operable to regulate the pressure and flow of gas supplied into the network. Examples of industrial gas production plants include steam methane reformer plants 103 for the production of hydrogen, carbon monoxide, and/or syngas; and air separation units for the production of oxygen, nitrogen, and/or argon. These plants typically are equipped with a distributed control system and/or model predictive controller which is operable to regulate the flow of feedgas into the production plant and the flow and/or pressure of product gas supplied to the gas pipeline network.

Natural gas receipt points are control elements, because they include a system of valves and/or compressors to regulate the flow of natural gas into the natural gas pipeline network. Natural gas delivery points are control elements, because they include a system of valves and/or compressors to regulate the flow of natural gas out of the natural gas pipeline network.

Gas compressor stations 104a, 104b are control elements, because they are operable to increase the pressure and regulate the flow of natural gas within a natural gas pipeline network.

Industrial gas customer receipt points 105 are control elements, because they are operable to receive a setpoint to regulate the flow and/or pressure of an industrial gas delivered to a customer.

In order to operate a gas pipeline network, it is desirable to provide setpoints to flow control elements in such a fashion that customer demand constraints and pressure constraints are satisfied simultaneously. To ensure that setpoints for flow control elements will result in satisfying demand and pressure constraints, it is necessary to calculate simultaneously the flows for each gas pipeline segment and gas pressures at network nodes. As described herein, in an exemplary embodiment, a network flow solution includes numerical values of flows for each pipeline segment and pressures for each pipeline junction that are: 1) self-consistent (in that laws of mass and momentum are satisfied), 2) satisfy customer demand constraints, and 3) satisfy pressure constraints.

The network flow solution may be determined using processing unit 110, an example of which is illustrated in FIG. 1B. Processing unit 110 may be a server, or a series of servers, or form part of a server. Processing unit 110 comprises hardware, as described more fully herein, that is used in connection with executing software/computer programming code (i.e., computer readable instructions) to carry out the steps of the methods described herein. Processing unit 110 includes one or more processors 111. Processor 111 may be any type of processor, including but not limited to a special purpose or a general-purpose digital signal processor. Processor 111 may be connected to a communication infrastructure 116 (for example, a bus or network). Processing unit 110 also includes one or more memories 112, 113. Memory 112 may be random access memory (RAM). Memory 113 may include, for example, a hard disk drive and/or a removable storage drive, such as a floppy disk drive, a magnetic tape drive, or an optical disk drive, by way of example. Removable storage drive reads from and/or writes to a removable storage unit (e.g., a floppy disk, magnetic tape, optical disk, by way of example) as will be known to those skilled in the art. As will be understood by those skilled in the art, removable storage unit includes a computer usable storage medium having stored therein computer software and/or data. In alternative implementations, memory 113 may include other similar means for allowing computer programs or other instructions to be loaded into processing unit 110. Such means may include, for example, a removable storage unit and an interface. Examples of such means may include a removable memory chip (such as an EPROM, or PROM, or flash memory) and associated socket, and other removable storage units and interfaces which allow software and data to be transferred from removable storage unit to processing unit 110. Alternatively, the program may be executed and/or the data accessed from the removable storage unit, using the processor 111 of the processing unit 110. Computer system 111 may also include a communication interface 114. Communication interface 114 allows software and data to be transferred between processing unit 110 and external device(s) 115. Examples of communication interface 114 may include a modem, a network interface (such as an Ethernet card), and a communication port, by way of example. Software and data transferred via communication interface 114 are in the form of signals, which may be electronic, electromagnetic, optical, or other signals capable of being received by communication interface 114. These signals are provided to communication interface 114 via a communication path. Communication path carries signals and may be implemented using wire or cable, fiber optics, a phone line, a wireless link, a cellular phone link, a radio frequency link, or any other suitable communication channel, including a combination of the foregoing exemplary channels. The terms "non-transitory computer readable medium", "computer program medium" and "computer usable medium" are used generally to refer to media such as removable storage drive, a hard disk installed in hard disk drive, and non-transitory signals, as described herein. These computer program products are means for providing software to processing unit 110. However, these terms may also include signals (such as electrical, optical or electromagnetic signals) that embody the computer program disclosed herein. Computer programs are stored in memory 112 and/or memory 113. Computer programs may also be received via communication interface 114. Such computer programs, when executed, enable processing unit 110 to implement the present invention as discussed herein and may comprise, for example, model predictive controller software. Accordingly, such computer programs represent controllers of processing unit 110. Where the invention is implemented using software, the software may be stored in a computer program product and loaded into processing unit 110 using removable storage drive, hard disk drive, or communication interface 114, to provide some examples.

External device(s) 115 may comprise one or more controllers operable to control the network control elements described with reference to FIG. 1A.

It is difficult to calculate a network flow solution for a gas pipeline network because of a nonlinear equation that relates the decrease in pressure of a gas flowing through a pipeline segment (the "pressure drop") to the flow rate of the gas. This nonlinear relationship between flow and pressure drop requires that a nonconvex nonlinear optimization program be solved to calculate a network flow solution. Nonconvex nonlinear programs are known to be NP-complete. (see Murty, K. G., & Kabadi, S. N. (1987). Some NP-complete problems in quadratic and nonlinear programming. Mathematical programming, 39(2), 117-129). The time required to solve an NP-complete problem increases very quickly as the size of the problem grows. Currently, it is not known whether it is even possible to solve a large NP-complete quickly.

It is difficult and time-consuming to solve a large NP-complete program. Also, the nature of the solution of a nonconvex mathematical program typically depends greatly on the way the mathematical program is initialized. As a result of these difficulties in solving a nonconvex mathematical program, it has not been practical to control flows in in a gas pipeline to satisfy pressure constraints using network flow solutions produced by nonconvex mathematical programs.

Because of the difficulty of computing network flow solutions, it is not uncommon to have so-called stranded molecules in a gas pipeline network. Stranded molecules are said to exist when there is unmet demand for a gas simultaneous with unused gas production capacity, due to pressure limitations in the network.

Because of the difficulty of computing network flow solutions, flows of gas pipeline segments, and gas pressures in a gas pipeline network, it is not uncommon to vent an industrial gas to the atmosphere when there are flow disturbances in the network.

There exists a need in the art for a fast and reliable method of computing a network flow solution which can be used to identify setpoints for control elements in a gas pipeline network and, more particularly, a sufficiently accurate linearization of the relationship between flow and pressure drop in pipeline segments that could be used to quickly calculate network flow solutions which could, in turn, be used to identify setpoints for network flow control elements.

The systems and methods of the present invention use information on customer demand values and available plant capacity ranges to bound the minimum and maximum flow rate for each pipeline segment in a pipeline network. In an exemplary embodiment, these bounds are computed using a computationally efficient network bisection method which is based on bounding the demand/supply imbalance on either side of a pipe segment of interest. Embodiments of the systems and methods of the present invention find the best linearization of the relationship between flow rate and pressure drop for each pipe segment, given the true nonlinear relationship between flow rate and pressure drop, as well as the computed minimum and maximum flow rates for each segment. Then, a linear program may be used to compute a network flow solution, given the linearization of the relationship between flow rate and pressure drop for each segment. The linear program incorporates prior bounds on the inaccuracy of the pressure drop linearization to ensure that the network flow solution will meet pressure constraints, given the actual nonlinear pressure drop relationship. Finally, certain setpoints for flow control elements are identified from the network flow solution. The setpoints are received by flow control elements to ensure that network pressure constraints are satisfied while also satisfying customer demand constraints.

The following provides the notation used to describe the preferred embodiments of the invention. The first column identifies the mathematical notation, the second column describes the mathematical notation, and the third column indicates the units of measure that may be associated with the quantity.

Sets

| | | |
|---|---|---|
| $n \in N$ | Nodes (representing pipeline junctions) | |
| $j \in A$ | Arcs (representing pipe segments and control elements) | |
| $G = (N,A)$ | Graph representing the layout of the gas pipeline network | |
| $e \in \{in,out\}$ | Arc endpoints | |
| $(n, j) \in A_{in}$ | Inlet of arc j intersects node n | |
| $(n, j) \in A_{out}$ | Outlet of arc j intersects node n | |
| $n \in D \subset N$ | Demand nodes | |
| $n \in S \subset N$ | Supply nodes | |
| $j \in P \subset A$ | Pipe arcs | |
| $j \in C \subset A$ | Control element arcs | |
| $L_j \in N$ | Left subgraph for arc j | |
| $R_j \in N$ | Right subgraph for arc j | |

Parameters

| | | |
|---|---|---|
| $D_j$ | Diameter of pipe j | [m] |
| $R$ | Gas constant | [N m kmol$^{-1}$ K$^{-1}$] |
| $Z$ | Compressibility factor | [no units] |
| $L_j$ | Length of pipe j | [m] |
| $M_w$ | Molecular weight of the gas | [kg kmol$^{-1}$] |
| $T_{ref}$ | Reference temperature | [K] |
| $\epsilon$ | Pipe roughness | [m] |
| $\alpha$ | Nonlinear pressure drop coefficient | [Pa kg$^{-1}$ m$^{-1}$] |
| $f_j$ | Friction factor for pipe j | [no units] |
| $\mu$ | Gas viscosity | [Pa s] |
| $Re_j$ | Reynold's number for flow in pipe j | [no units] |
| $q_j^{min}$ | Minimum flow rate for flow in pipe j | [kg/s] |
| $q_j^{max}$ | Maximum flow rate for flow in pipe j | [kg/s] |
| $b_j$ | Intercept for linear pressure drop model for pipe j | [Pa$^2$] |
| $m_j$ | Slope for linear pressure drop model for pipe j | [Pa$^2$ s/kg] |
| $d_n$ | Demand in node n | [kg/s] |
| $s_n^{min}$ | Minimum production in node n | [kg/s] |
| $s_n^{min}$ | Maximum production in node n | [kg/s] |

Variables

| | | |
|---|---|---|
| $q_j$ | Flow rate in pipe j | [kg/s] |
| $s_n$ | Production rate in node n | [kg/s] |
| $p_n^{node}$ | Pressure at node n | [Pa] |
| $p_j^e$ | Pressure at a particular end of a particular pipe | [Pa] |
| $ps_n^{node}$ | Squared pressure at node n | [Pa$^2$] |
| $ps_j^e$ | Squared pressure at a particular end of a particular pipe | [Pa$^2$] |
| $ps_j^{err}$ | Maximum absolute squared pressure drop error for pipe j | [Pa$^2$] |
| $ps_n^{err}$ | Maximum absolute squared pressure error for node n | [Pa$^2$] |

For the purposes of computing a network flow solution, the layout of the pipeline network is represented by an undirected graph with a set of nodes (representing pipeline junctions) and arcs (representing pipeline segments and certain types of control elements). The following provides some basic terminology associated with undirected graphs.

An undirected graph G=(N,A) is a set of nodes N and arcs A. The arc set A consists of unordered pairs of nodes. That is, an arc is a set {m, n}, where m, n∈N and m≠n. By convention, we use the notation (m,n), rather than the notation {m, n}, and (m,n) and (n,m) are considered to be the same arc. If (m,n) is an arc in an undirected graph, it can be said that (m,n) is incident on nodes m and n. The degree of a node in an undirected graph is the number of arcs incident on it.

If (m,n) is an arc in a graph G=(N,A), it can be said that node m is adjacent to node n. The adjacency relation is symmetric for an undirected graph. If m is adjacent to n in a directed graph, it can be written m→n.

A path of length k from a node m to a node m' in a graph G=(N,A) is a sequence $(n_0, n_1, n_2, \ldots, n_k)$ of nodes such that m=$n_0$, m'=$n_k$, and $(n_{i-1}, n_i) \in A$ for i=1, 2, . . . , k. The length of the path is the number of arcs in the path. The path contains the nodes $n_0, n_1, n_2 \ldots n_k$ and the arcs $(n_0, n_1)$, $(n_1, n_2)$, . . . $(n_{k-1}, n_k)$. (There is always a 0-length path from m to m). If there is path p from m to m', we say that m' is reachable from m via p. A path is simple if all nodes in the path are distinct.

A subpath of path $p=(n_0, n_1, n_2 \ldots n_k)$ is a contiguous subsequence of its nodes. That is, for any 0≤i≤j≤k, the subsequence of nodes $(n_i, n_{i+1}, \ldots, n_j)$ is a subpath of p.

In an undirected graph, a path $(n_0, n_1, n_2, \ldots, n_k)$ forms a cycle if $k \geq 3$, $n_0 = n_k$, and $n_1, n_2 \ldots n_k$ are distinct. A graph with no cycles is acyclic.

An undirected graph is connected if every pair of nodes is connected by a path.

The connected components of a graph are the equivalence classes of nodes under the "is reachable from" relation. An undirected graph is connected if it has exactly one connected component, that is, if every node is reachable from every other node.

Graph $G'=(N',A')$ is a subgraph of $G=(N,A)$ if $N' \subseteq N$ and $A' \subseteq A$. Given a set $N' \subseteq N$, the subgraph of $G$ induced by $N'$ is the graph $G'=(N',A')$, where $A'=((m,n) \in A: m,n \in N')$.

To establish a sign convention for flow in a gas pipeline network represented by an undirected graph, it is necessary to designate one end of each pipe arc as an "inlet" and the other end as an "outlet":

$(n,j) \in Ai_n$ Inlet of arc $j$ intersects node $n$ $(n,j) \in A_{out}$ Outlet of arc $j$ intersects node $n$ This assignment can be done arbitrarily, as embodiments of the present invention allow for flow to travel in either direction. By convention, a flow has a positive sign if the gas is flowing from the "inlet" to the "outlet", and the flow has a negative sign if the gas is flowing from the "outlet" to the "inlet".

Some nodes in a network are associated with a supply for the gas and/or a demand for the gas. Nodes associated with the supply of a gas could correspond to steam methane reformers in a hydrogen network; air separation units in an atmospheric gas network; or gas wells or delivery points in a natural gas network. Nodes associated with a demand for the gas could correspond to refineries in a hydrogen network; factories in an atmospheric gas network; or receipt points in a natural gas network.

A set of mathematical equations govern flows and pressures within a gas pipeline network. These equations derive from basic physical principles of the conservation of mass and momentum. The mathematical constraints associated with a network flow solution are described below.

Node Mass Balance

The node mass balance stipulates that the total mass flow leaving a particular node is equal to the total mass flow entering that node.

$$d_n + \sum_{j|(n,j) \in A_{in}} q_j = \sum_{j|(n,j) \in A_{out}} q_j + s_n$$

The left-hand side of the equation represents the flow leaving a node, as $d_n$ is the customer demand associated with the node. The term $\sum_{j|(n,j) \in A_{in}} q_j$ represents the flow associated with pipes whose "inlet" side is connected to the node. If the flow $q_j$ is positive, then it represents a flow leaving the node. The right-hand side of the equation represents the flow entering a node, as $s_n$ is the plant supply associated with the node. The term $\sum_{j|(n,j) \in A_{out}} q_j$ represents the flow associated with pipe segments whose "outlet" side is connected to the node. If the flow term $q_j$ is positive, then it represents a flow entering the node.

Node Pressure Continuity

The node pressure continuity equations require that the pressure at the pipe ends which is connected to a node should be the same as the pressure of the node.

$p_j^{in} = p_n^{node} \forall (n,j) \in A_{in}$ $p_j^{out} = p_n^{node} \forall (n,j) \in A_{out}$ Pipe Pressure Drop The relationship between the flow of a gas in the pipe is nonlinear. A commonly used equation representing the nonlinear pressure drop relationship for gas pipelines is presented here. Other nonlinear relationships may be used in connection with alternative embodiments of the present invention.

This nonlinear pressure drop equation for gases in cylindrical pipelines is derived based on two assumptions. First, it is assumed that the gas in the pipeline network is isothermal (the same temperature throughout). This is a reasonable assumption because pipelines are often buried underground and there is excellent heat transfer between the pipeline and the ground. Under the isothermal assumption, an energy balance on the gas in the pipeline yields the following equation:

$$(p_j^{in})^2 - (p_j^{out})^2 = q_j|q_j| \frac{4ZRT}{M_w \pi^2 D_j^4} \left[ \frac{4f_j L_j}{D_j} + 2\ln\left(\frac{p_j^{in}}{p_j^{out}}\right) \right]$$

For gas pipelines, because the pipe lengths are large relative to the diameters, the term $$\frac{4f_j L_j}{D}$$

is so much greater than the term $$2\ln\left(\frac{p_j^{in}}{p_j^{out}}\right)$$

that the latter term can be neglected. Under this assumption, then the nonlinear pressure drop relationship reduces to:

$$(p_j^{in})^2 - (p_j^{out})^2 = \alpha q_j|q_j| \text{ with } \alpha = \frac{16 \, ZRf_j T_{ref} L_j}{M_w \pi^2 D_j^5}$$

where $Z$ is the compressibility factor for the gas, which in most pipelines can be assumed to be a constant near 1; $R$ is the universal gas constant; $T_{ref}$ is the reference temperature; $L_j$ is the length of the pipeline segment; and the term $f_j^e$ is a friction factor for a pipe segment, which varies weakly based on the Reynolds number of flow in the pipe, and for most gas pipelines is in the range 0.01-0.08. Below we provide an explicit formula for the friction factor in terms of the Reynold's number. The dimensionless Reynold's number is defined as $$Re_j = \frac{4|q_j|}{\pi D_j \mu},$$

where $\mu$ is the gas viscosity.

If the flow is laminar ($Re_j^e < 2100$) then the friction factor is $$f_{j,L} = \frac{64}{Re_j}$$

If the flow is turbulent ($Re_j^e > 4000$), then the friction factor may be determined using the implicit Colebrook and White equation:

$$\frac{1}{\sqrt{f_{j,TR}}} = -2\log_{10}\left(\frac{\epsilon}{3.71\,D} + \frac{2.51}{Re_j \sqrt{f_{j,TR}}}\right).$$

An explicit expression for the friction factor for turbulent flow that is equivalent to the Colebrook and White equation is $$f_{j,TR} = \frac{1}{[c[W_0(e^{a/bc}/bc)] - a/b]^2} \text{ where}$$

$$a = \frac{\epsilon}{3.71\,D}, b = \frac{2.51}{Re}, \text{ and } c = \frac{2}{\ln(10)} = 0.868589$$

and $W_0(\sim)$ is the principal Lambert-W function. See (More, A. A. (2006). Analytical solutions for the Colebrook and White equation and for pressure drop in ideal gas flow in pipes. *Chemical engineering science*, 61(16), 5515-5519) and (Brkic, D. (2009). Lambert W-function in hydraulics problems. In *MASSEE International Congress on Mathematics MICOM, Ohrid.*).

When the Reynolds number is between 2100 and 4000, the flow is in a transition range between laminar and turbulent flow and the accepted approach in the literature is to interpolate the friction factor between the laminar and the turbulent value, based on the Reynolds number, as follows:

$$f_{j,TS} = f_{j,L|2100}\beta + f_{j,TR4000}(1-\beta)$$

with $\beta = (4000 - Re_j)/(4000 - 2100)$.

Typical Design Parameters for Gas Pipeline Networks

Mainline natural transmission pipes are usually between 16 and 48 inches in diameter. Lateral pipelines, which deliver natural gas to or from the mainline, are typically between 6 and 16 inches in diameter. Most major interstate pipelines are between 24 and 36 inches in diameter. The actual pipeline itself, commonly called 'line pipe', consists of a strong carbon steel material, with a typical roughness of 0.00015 feet. Thus, the relative roughness for natural gas transmission pipelines is typically in the range 0.00005 to 0.0003 and the friction factor is in the range 0.01 to 0.05 under turbulent flow conditions.

Hydrogen distribution pipelines typically have a diameter in the range 0.3-1.2 feet, and a typical roughness of 0.00016 feet. Thus, the relative roughness for hydrogen transmission pipelines is typically in the range 0.0001 to 0.0005 and the friction factor is in the range 0.012 to 0.05 under turbulent flow conditions.

Figure 2:
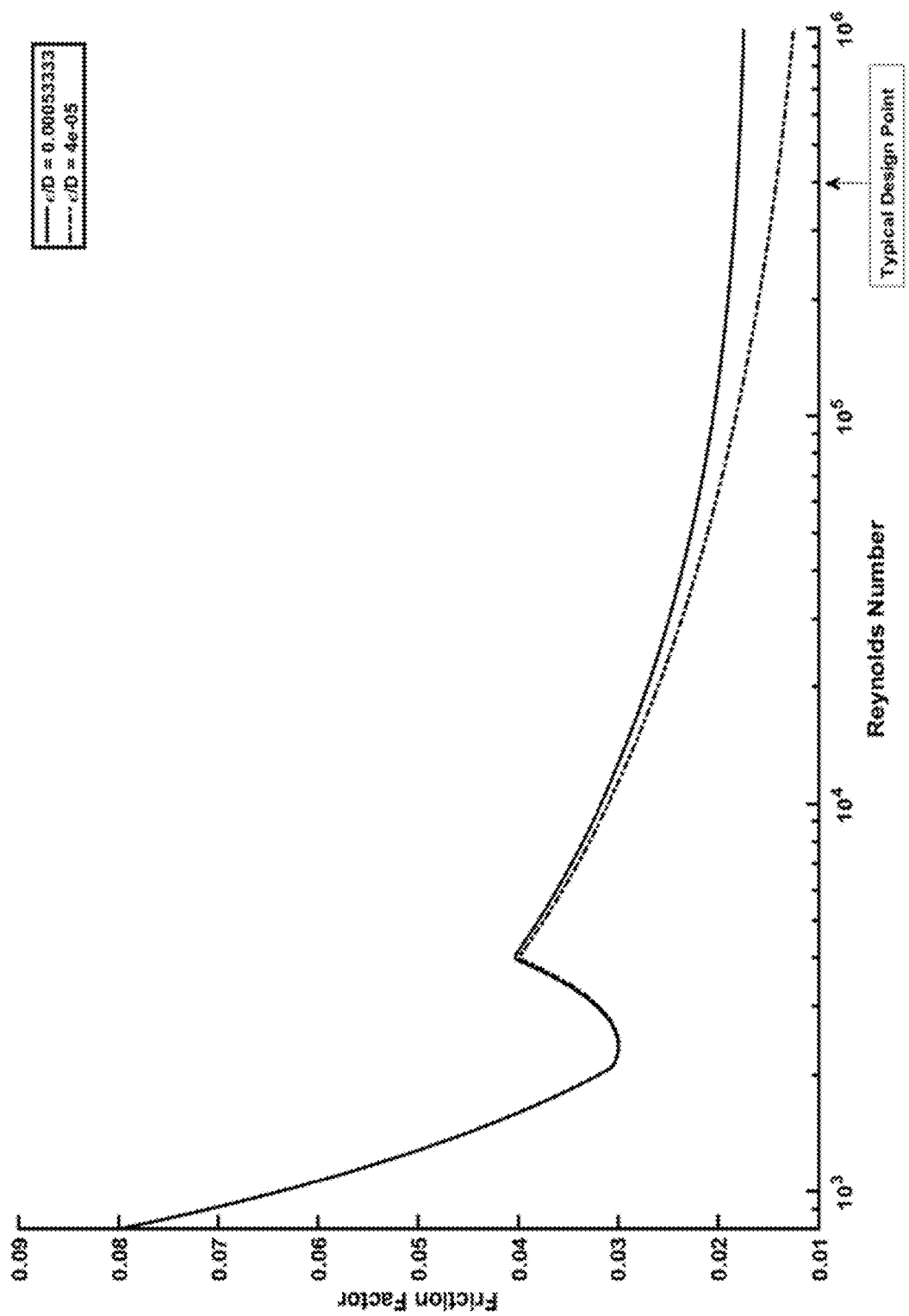
FIG. 2 shows the typical range of Reynolds numbers and friction factors for gas pipeline networks.

For gas pipeline networks, a typical design Reynold's number is 400,000. FIG. 2 shows the typical range of Reynold's numbers and the associated friction factors for gas pipeline networks.

Establishing Bounds on the Flows in Pipe Segments

A key enabler for the efficient computation of network flow solutions is the linearization of the nonlinear pressure drop relationship. To produce an accurate linearization of the pressure drop relationship for pipe segments, it is critical to bound the range of flow rates for each pipe segment. In examples below, a linearization based on tightly bounded flow rates is referred to as a "tight linearization".

Figure 3:
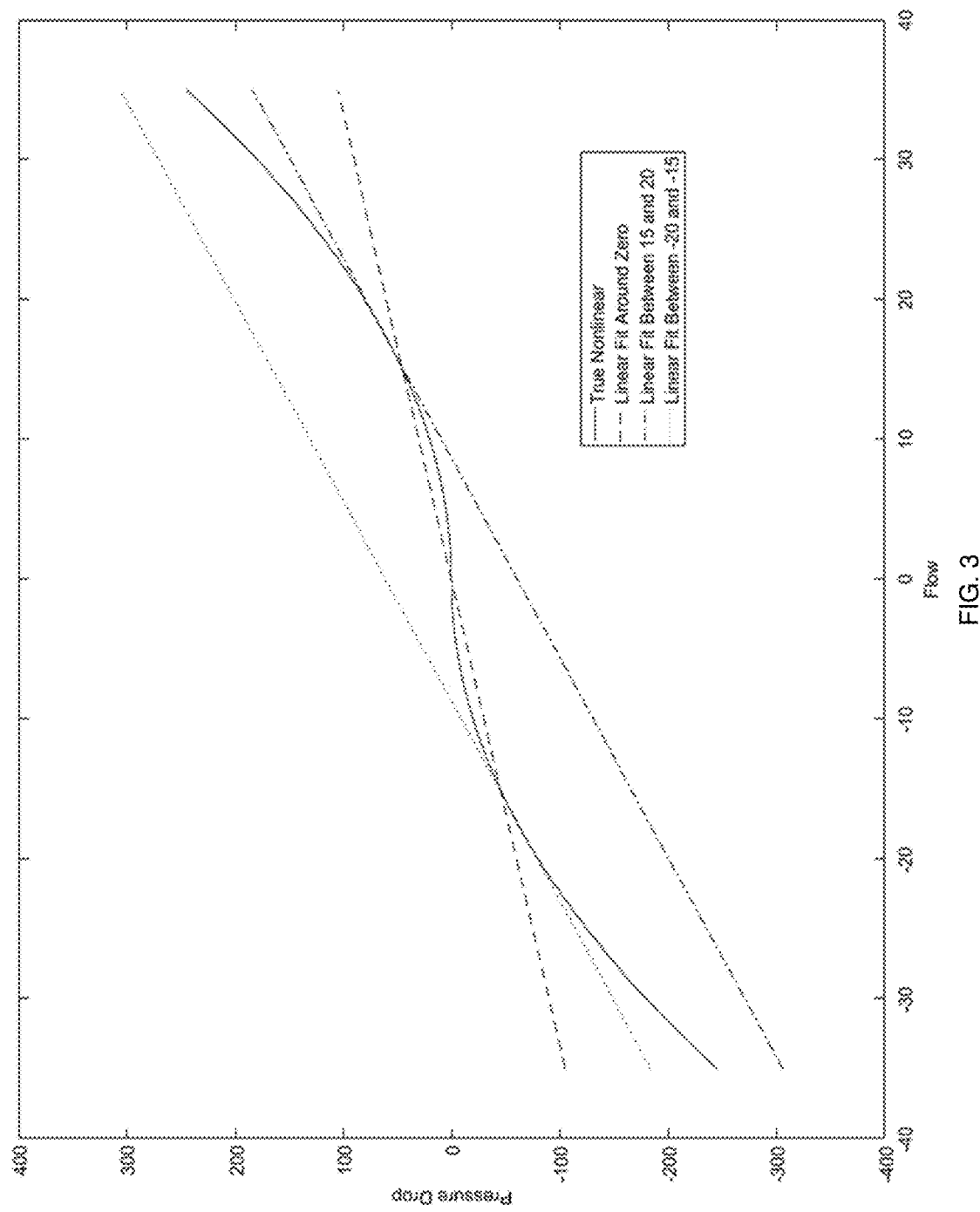
FIG. 3 shows the nonlinearity of the relationship between flow and pressure drop.

FIG. 3 illustrates the nonlinear relationship between pressure drop and flow. The true nonlinear relationship is indicated by the solid line. If one approximates the true nonlinear relationship with a linear fit centered around zero, the linear fit severely underestimates the pressure drop for flow magnitudes exceeding 20. If one does a linear fit of the true pressure drop relationship in the range of flows between 15 and 20, the quality of the pressure drop estimate for negative flows is very poor. If one does a linear fit of the true pressure drop relationship in the range between −20 and −15 MMSCFD, the pressure drop estimate for positive flows is very poor.

Bounds on flow rates can be determined using mass balances and bounds on production for plants and demand for customers, even in the absence of any assumptions about pressure constraints and pressure drop relationships.

One method for bounding flows in pipeline segments based on mass balances is to formulate and solve a number of linear programs. For each pipe segment, one linear program can be used to determine the minimum flow rate in that segment and another linear program can be used to determine the maximum flow rate in that segment.

An exemplary embodiment of the present invention involves a method of bounding the flow rate in pipeline segments that is simple and computationally more efficient than the linear programming method.

For the pipe segment of interest (assumed to not be in a graph cycle), the pipeline network is bisected into two subgraphs at the pipe segment of interest: a "left" subgraph and a "right" subgraph associated with that pipe. Formally, the left subgraph $L_j$ associated with pipe j is the set of nodes and arcs that are connected with the inlet node of pipe j once the arc representing pipe j is removed from the network. Formally, the right subgraph $R_j$ associated with pipe j is the set of nodes and arcs that are connected with the outlet node of pipe j once the arc representing pipe j is removed from the network. Given the bisection of the flow network into a left subgraph and a right subgraph, it is then possible to calculate the minimum and maximum signed flow through pipe segment j, based on potential extremes in supply and demand imbalance in the left subgraph and the right subgraph.

To bound the flow rate in each pipeline segment, some quantities describing the imbalance between supply and demand are defined in the left and right subgraphs. The minimum undersupply in the left subgraph for pipe j is defined as $s_{L_j}^{min} = (\Sigma_{n \in L}\, s_n^{min}) - (\Sigma_{n \in L}\, d_n)$. The minimum unmet demand in the right subgraph for pipe j is defined as $d_{R_j}^{min} = (\Sigma_{n \in r}\, d_n) - (\Sigma_{n \in R}\, s_n^{max})$. The maximum oversupply in the left subgraph for pipe j is defined as $s_L^{max} = (\Sigma_{n \in L}\, s_n^{max}) - (\Sigma_{n \in L}\, d_n)$. The maximum unmet demand in the right subgraph for pipe j is defined as $d_R^{max} = (\Sigma_{n \in R}\, d_n) - (\Sigma_{n \in R}\, s_n^{min})$.

Given the definitions above, the minimum and maximum feasible signed flow in the pipe segment are given by:

$$q_j^{min} = \max\{s_{L_j}^{min}, d_{R_j}^{min}\},$$

$$q_j^{max} = \max\{s_{L_j}^{max}, d_{R_j}^{max}\},$$

The equation for $q_j^{min}$ indicates that this minimum (or most negative) rate is the maximum of the minimum undersupply in the left subgraph and the minimum unmet demand in the right subgraph. The equation for $q_j^{max}$ indicates that this maximum (or most positive) rate is the minimum of the maximum oversupply in the left subgraph and the maximum unmet demand in the right subgraph.

The preceding equations for calculating $q_j^{min}$ and $q_j^{max}$ can be derived from the node mass balance relationship, as follows. The node mass balance relationship, which was previously introduced, is $$d_n + \sum_{j|(n,j) \in A_{in}} q_j = \sum_{j|(n,j) \in A_{out}} q_j + s_n.$$

Consider the left subgraph associated with pipe j. The left subgraph contains the node connected to the inlet of pipe j. Consider collapsing the entire left subgraph into the single node connected to the inlet of pipe j. Then, $$q_j^{in} = \sum_{n \in L_j} s_n - d_n$$

An upper bound for the inlet flow is $q_j^{in} \leq \sum_{n \in L_j} s_n^{max} - d_n$, and a lower bound for the inlet flow is $q_j^{in} \geq \sum_{n \in L_j} s_n^{min} - d_n$. Similarly, an upper bound for the outlet flow is $q_j^{out} \leq \sum_{n \in R_j} d_n - s_n^{min}$ and a lower bound is $q_j^{out} \geq \sum_{n \in R_j} d_n - s_n^{max}$.

At steady state, the pipe inlet flow equals the outlet flow and $$\sum_{n \in L_j} s_n^{min} - d_n \leq \sum_{n \in R_j} d_n - s_n^{max} \leq q_j^{in} =$$

$$q_j^{out} = q_j \leq \sum_{n \in R_j} d_n - s_n^{min} \leq \sum_{n \in L_j} s_n^{max} - d_n.$$

Equivalently, $$\max \left\{ \sum_{n \in L_j} s_n^{min} - d_n, \sum_{n \in R_j} d_n - s_n^{max} \right\} \leq q_j^{in} =$$

$$q_j^{out} = q_j \leq \min \left\{ \sum_{n \in R_j} d_n - s_n^{min}, \sum_{n \in L_j} s_n^{max} - d_n \right\} \text{ or}$$

$$q_j^{min} = \max\{s_{L_j}^{min}, d_{R_j}^{min}\} \leq = \leq q_j \leq \min\{s_{L_j}^{max}, d_{R_j}^{max}\} = q_j^{max},$$

which completes the proof.

Figure 4:
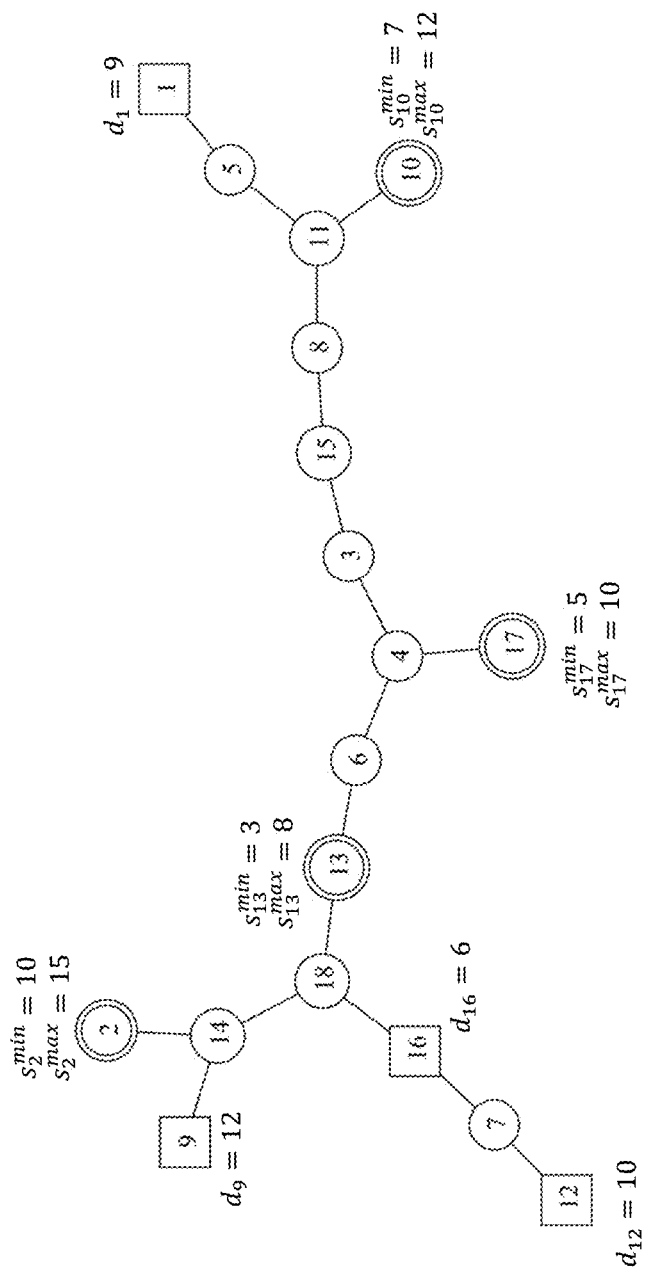
FIG. 4 represents an example pipeline network for illustrating method for bounding flow rates in pipe segments.

The bisection method for bounding flow rates in pipe segments is illustrated with an example. An example flow network is depicted in FIG. 4. This flow network has four customer demand nodes (nodes 1, 9, 12, and 16), and four plant supply nodes (nodes 2, 10, 13, and 17).

Figure 5:
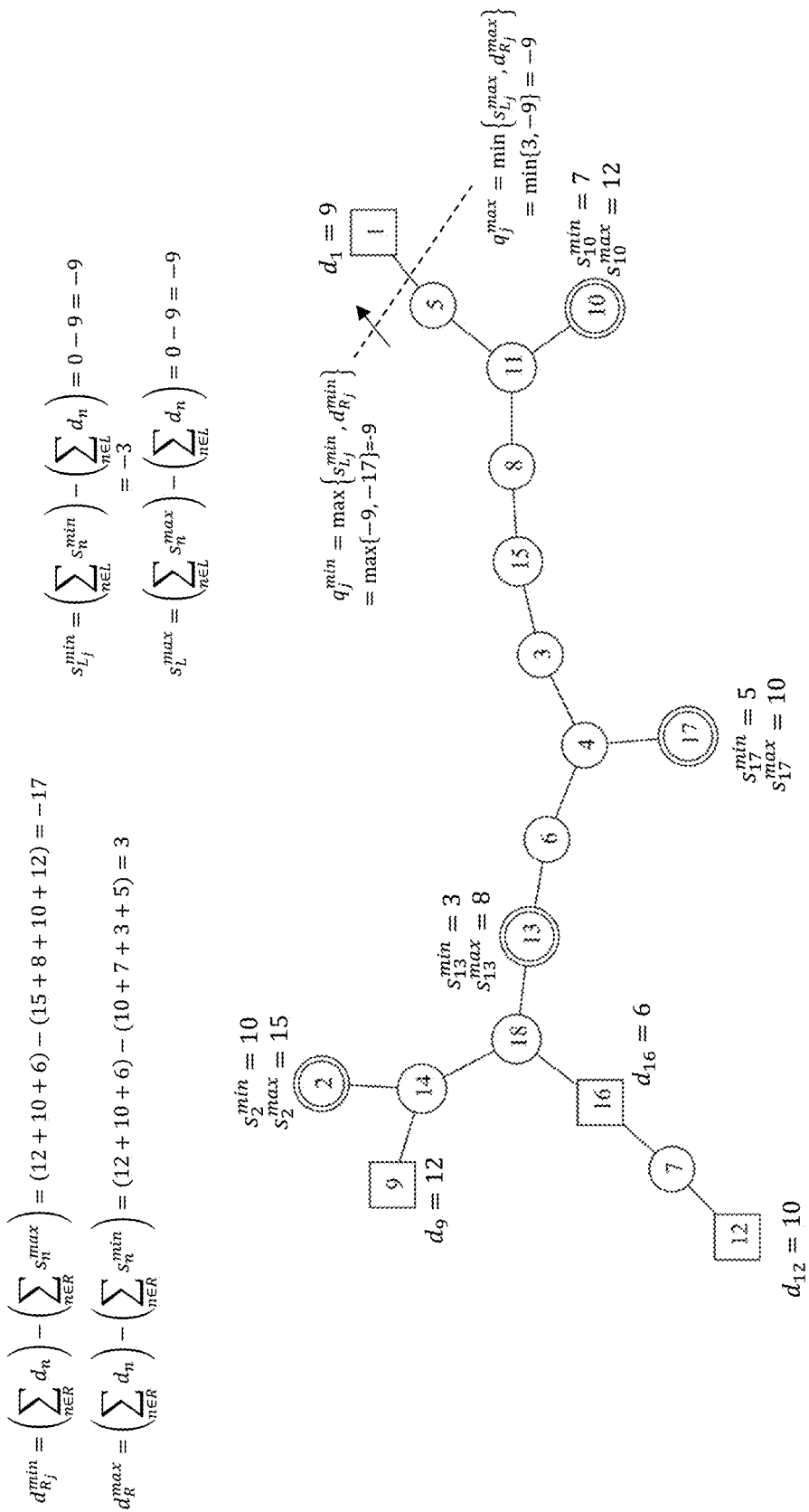
FIG. 5 is a first example illustrating the bisection method for bounding flows in pipes.

FIG. 5 illustrates how the bisection method can be used to bound the flow rate in the pipe segment connecting node 1 with node 5. Recall that the sign convention for flow rates is that a flow is negative if it is in the direction going from a lower-numbered node to a higher-numbered node. In this case, the minimum and maximum flow rate is −9 kg/s, which is consistent with a flow of 9 kg/s being provided to the customer at node 1.

FIG. 6 shows using the network bisection method to bound the flow in the pipe segment going from node 10 to node 11. In this case, the range of flows is between 7 and 12 kg/s, which is consistent with flow of the gas from the production plant at node 10 to the rest of the network. This range is consistent with the minimum and maximum production rate of the plant.

While simplistic for illustration purposes, the results of these examples validate the correctness of the network bisection method for bounding the flow rates in pipes. The next example, presented in FIG. 7, is a more complex example of using the network bisection method to bound the flow rate in the pipe leading from node 3 to node 15. In this case, the flow can vary from −6 kg/s (a flow going from node 15 to node 3) to 2 kg/s (a flow going from node 3 to node 15).

Figure 8:
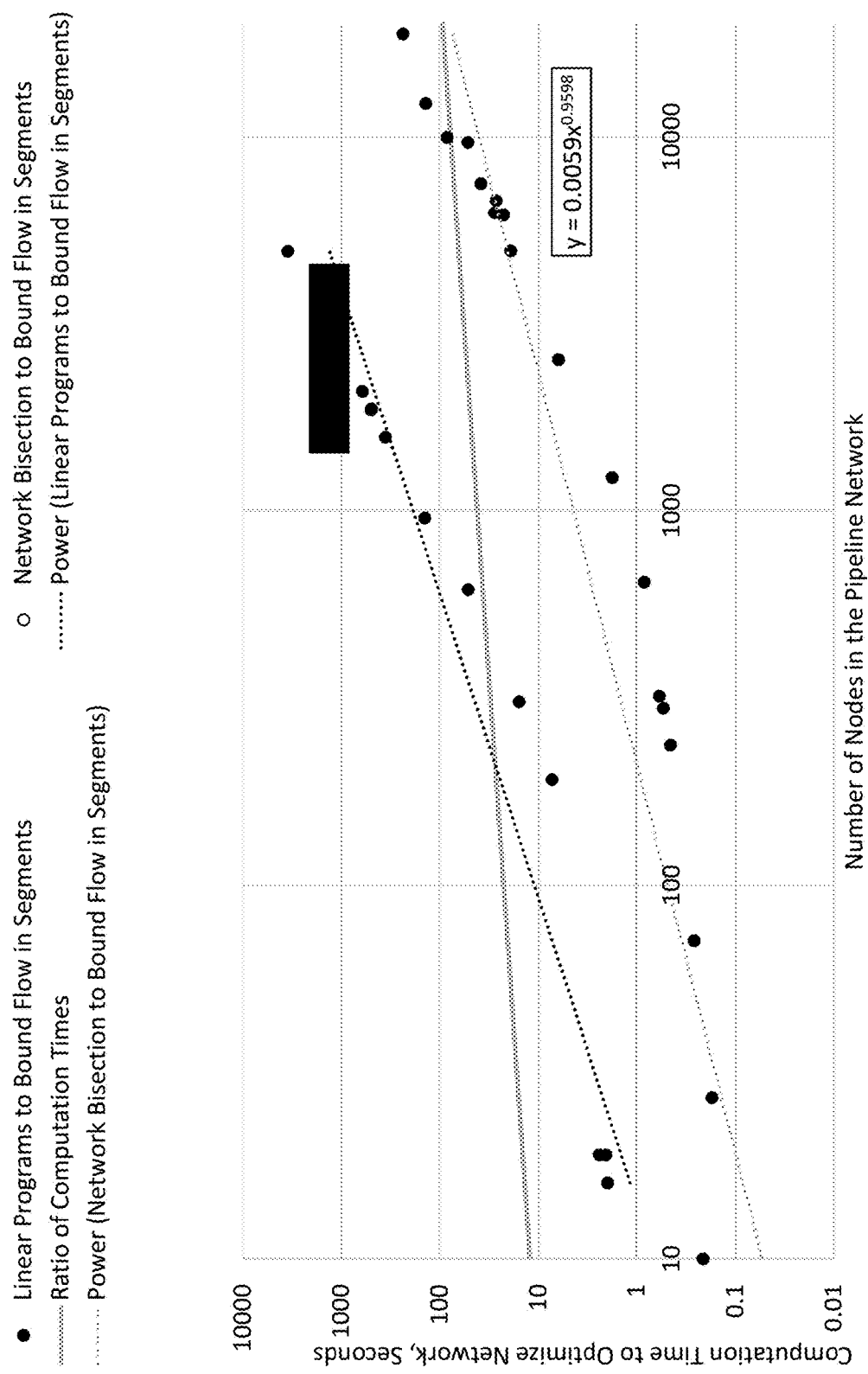
FIG. 8 shows a comparison of the computation times for two different methods for bounding flow in pipe segments.

FIG. 8, which shows data from computational experiments performed using Matlab on a computer with an Intel Core I 2.80 GHz processor, shows that the network bisection method for bounding the flow in pipeline segments is between 10 and 100 times faster than the linear programming method.

Finding a Linear Pressure-Drop Model

A further step in the method of exemplary embodiments of the invention involves linearizing the nonlinear pressure drop relationship for each pipe, based on the flow bounds established for each pipe. This can be done analytically (if the bounded flow range is narrow enough that the friction factor can be assumed to be constant over the flow range), or numerically (if the bounded flow range is sufficiently wide that the friction factor varies significantly over the flow range). Below is described how a linearization can be accomplished either analytically or numerically. What is sought is a linear pressure drop model of the form $$ps_j^{in} - ps_j^{out} = m_j q_j + b_j \, \forall j \in P.$$

Bounding the flow range is critical to produce a good linear model. Without these bounds, a naïve linear model may be produced, which is based on linearizing the nonlinear relationship about zero with a minimum and maximum flow magnitude equal to the total network demand. As will be shown in examples below, this generally does not produce good network flow solutions.

Finding the Least-Squares Linear Pressure-Drop Model Analytically: Slope-Intercept Form If the bounded flow range is fairly narrow, then the friction factor as well as the nonlinear pressure drop coefficient α will be nearly constant and an analytical solution may be found for the least squares linear fit of the nonlinear pressure drop relationship.

By definition, the least squares solution for a linear model with $g = q_j^{min}$ and $h = q_j^{max}$ satisfies $$(m_j^*, b_j^*) = \arg\min_{m,b} \int_g^h (\alpha q|q| - mq - b)^2 dq$$

Evaluating the definite integral:

$$\int_g^h (\alpha q|q| - mq - b)^2 dq =$$

$$b^2 h - b^2 g - g^3 \left( \frac{m^2}{3} - \frac{2\alpha b \operatorname{sign}(g)}{3} \right) + h^3 \left( \frac{m^2}{3} - \frac{2\alpha b \operatorname{sign}(h)}{3} \right) -$$

$$\frac{\alpha^2 g^5}{5} + \frac{\alpha^2 h^5}{5} - bg^2 m + bh^2 m + \frac{\alpha g^4 m \operatorname{sign}(g)}{2} - \frac{\alpha h^4 m \operatorname{sign}(h)}{2}$$

This quantity is minimized when the partial derivatives with respect to b and m are simultaneously zero. These partial derivatives are $$\frac{\partial \int_g^h (\alpha q|q| - mq - b)^2 dq}{\partial b} =$$

$$2bh - 2bg - g^2m + h^2m + \frac{2ag^3\mathrm{sign}(g)}{3} - \frac{2ah^3\mathrm{sign}(h)}{3}$$

$$\frac{\partial \int_g^h (\alpha q|q| - mq - b)^2 dq}{\partial m} =$$

$$bh^2 - bg^2 - \frac{2g^3m}{3} + \frac{2h^3m}{3} + \frac{ag^4\mathrm{sign}(g)}{2} - \frac{ah^4\mathrm{sign}(h)}{2}$$

Setting the partial derivatives equal to zero, and solving for b and m, the form of the slope-intercept least squares linear model is:

$$b^* = -\frac{(\alpha g^5\mathrm{sign}(g) - \alpha h^5\mathrm{sign}(h) - 8\alpha g^3 h^2\mathrm{sign}(g) + 8\alpha g^2 h^3\mathrm{sign}(h) + \alpha g^4 h\mathrm{sign}(g) + \alpha g h^4\mathrm{sign}(h))}{(6(g-h)(g^2 - 2gh + h^2))}$$

$$m^* = \frac{(\alpha g^4\mathrm{sign}(g) - \alpha h^4\mathrm{sign}(h) - 2\alpha g^3 h\mathrm{sign}(g) + 2\alpha g h^3\mathrm{sign}(h))}{(g^3 - 3g^2 h + 3g h^2 - h^3)}$$

Finding the Least Squares Model Empirically: Slope-Intercept Model

If the bounded flow range for a pipe segments spans more than a factor of two, then the friction factor may vary significantly over that flow range and there is no analytical expression for the least-squares linear fit of the nonlinear pressure drop relationship. In this case, one exemplary preferred approach for developing a least-squares linear fit of the nonlinear pressure drop is a numerical approach.

This approach entails using numerical linear algebra to calculate the value of the slope and intercept using the formula.

$$\begin{bmatrix} m \\ b \end{bmatrix} = (Q^T Q)^{-1} Q^T y$$

where m is the slope of the line, b is the intercept of the line, Q is a matrix the first column of the matrix Q contains a vector of flow rates ranging from the minimum signed flow rate for the segment to the maximum signed flow rate for the segment, and the second column is a vector of ones.

$$Q = \begin{bmatrix} q_{min} & 1 \\ \vdots & \vdots \\ q_{max} & 1 \end{bmatrix}$$

The vector y contains the pressure drop as calculated by the nonlinear pressure drop relationship, at flow rates ranging from the minimum signed flow rate to the maximum signed flow rate. Since the friction factor varies over this flow range, a different value of the nonlinear pressure drop relationship $\alpha$ may be associated with each row of the vector.

$$y = \begin{bmatrix} \alpha_{min} q_{min} |q_{min}| \\ \vdots \\ \alpha_{max} q_{max} |q_{max}| \end{bmatrix}$$

As an example, consider the following data from a nonlinear pressure drop model:

| Flow, kg/s | Change in squared pressure, $Pa^2$ |
| --- | --- |
| 2.0 | 7.7 |
| 3.0 | 12.1 |
| 4.0 | 17.9 |
| 5.0 | 25.3 |
| 6.0 | 34.1 |
| 7.0 | 44.3 |

Given this data, $$q_{min} = 2.0, \quad q_{max} = 7.0, \quad Q = \begin{bmatrix} 2.0 & 1 \\ 3.0 & 1 \\ 4.0 & 1 \\ 5.0 & 1 \\ 6.0 & 1 \\ 7.0 & 1 \end{bmatrix}, \text{ and } y = \begin{bmatrix} 7.7 \\ 12.1 \\ 17.9 \\ 25.3 \\ 34.1 \\ 44.3 \end{bmatrix}.$$

Applying the formula $$\begin{bmatrix} m \\ b \end{bmatrix} = (Q^T Q)^{-1} Q^T y,$$

we determine that the parameters of the least-squares linear fit are m=7.33 and b=−9.40.

Finding the Least Squares Model Numerically: A Slope Only Model

In some instances, if the flow range includes transition turbulent flow, includes laminar flow, or includes both turbulent and laminar flow regimes, there is no analytical expression for the least-squares linear fit of the nonlinear pressure drop relationship. In this case, the preferred approach for developing a least-squares linear fit of the nonlinear pressure drop is a numerical approach.

This approach involves calculating the value of the $$m = (q^T q)^{-1} q^T y$$

where m is the slope of the line, q is a vector of flow rate values ranging from the minimum signed flow rate for the segment to the maximum signed flow rate for the segment $$q = \begin{bmatrix} q_{min} \\ \vdots \\ q_{max} \end{bmatrix}$$

The vector y contains the pressure drop as calculated by the nonlinear pressure drop relationship, at flow rates ranging from the minimum signed flow rate to the maximum signed flow rate. Since the friction factor varies over this flow range, a different value of the nonlinear pressure drop relationship $\alpha$ may be associated with each row of the vector.

$$y = \begin{bmatrix} \alpha_{min} q_{min} |q_{min}| \\ \vdots \\ \alpha_{max} q_{max} |q_{max}| \end{bmatrix}$$

As an example, consider the following data from a nonlinear pressure drop model:

| Flow, kg/s | Change in squared pressure, Pa$^2$ |
|---|---|
| −3.0 | −24.2 |
| −2.0 | −7.5 |
| −1.0 | −1.0 |
| 0.0 | 0.0 |
| 1.0 | 1.0 |
| 2.0 | 7.5 |

Given this data, $$q_{min} = 2.0, \quad q_{max} = 7.0, \quad q = \begin{bmatrix} -3.0 \\ -2.0 \\ -1.0 \\ 0.0 \\ 1.0 \\ 2.0 \end{bmatrix}, \text{ and } y = \begin{bmatrix} -24.2 \\ -7.5 \\ -1.0 \\ 0.0 \\ 1.0 \\ 7.5 \end{bmatrix}.$$

Applying the formula $m=(q^T q)^{-1} q^T y$, it is determined that the parameter of the least-squares linear fit is m=5.51.

Choosing the Most Appropriate Linear Model

Above described are several methods for calculating the best linear fit of the nonlinear pressure drop relationship, given the minimum and maximum flow rates. Also described is how to find the best slope-only linear model, given the minimum and maximum flow rates. An open question is in which situations it is appropriate to use the slope/intercept model, and in which situations it is best to use the slope-only model. A key principle here is that the linear model should always give the correct sign for the pressure drop. In other words, for any linear model exercised over a bounded flow range, the sign of the predicted pressure drop should be consistent with the flow direction. Pressure should decrease in the direction of the flow. Note that the slope-only model has an intercept of zero, and thus the slope-only model will show sign-consistency regardless of the flow range. So, a slope-intercept model should be used unless there is a point in the allowable flow range where there would be a sign inconsistency; if a slope-intercept model would create a sign-inconsistency, then the slope-only model should be used.

Identifying the Nonlinear Pressure Drop Coefficient from Experimental Data

The methods described above for creating a linearization of the nonlinear pressure drop relationship rely on knowledge of the nonlinear pressure drop parameter α.

In some cases, the nonlinear pressure drop coefficient α may be calculated directly using the formula $$\alpha = \frac{16 Z R f_j T_{ref} L_j}{M_w \pi^2 D_j^5}$$

if the length of the pipe segment, the diameter of the pipe segment, the friction factor, and the gas temperature are known. In other cases, these quantities may not be known with sufficient accuracy. In such situations, α can still be estimated if historical data on flow rates and pressure drops for the pipe are available.

If historical data on flow rates and pressure drops for a pipe are available, with a minimum signed flow rate of $q_{min}=g$ and a maximum signed flow rate of $q_{max}=h$, then the first step in estimating α is to fit a line to the data $(p_j^{in})^2 - (p_j^{out})^2$ as a function of the flow rate q. The line of best slope is parameterized by a calculated slope m and intercept b.

Given a linear fit for data in slope-intercept form over a given flow range, it is now shown how to recover a least-squares estimate of the nonlinear pressure drop parameter α. The best estimate α*, given the flow range (g,h), the best slope estimate m, and the best intercept estimate b satisfies the least squares relationship $$\alpha^* = \underset{\alpha}{\arg\min} \int_g^h (\alpha q |q| - mq - b)^2 dq$$

It can be shown that an equivalent expression for α* as a function of the flow range (g,h), the best slope estimate m, and the best intercept estimate b is $$\alpha^* = \frac{20 b g^3 \text{sign}(g) - 20 b h^3 \text{sign}(h) + 15 g^4 m \text{sign}(g) - 15 h^4 m \text{sign}(h)}{12 g^5 \text{sign}(g)^2 - 12 h^5 \text{sign}(h)^2}$$

which is the formula that can be used to estimate α given historical data of pressure drop over a flow range.

Bounding the Error in the Linearized Pressure Predictions for the Pipeline Network Above a method is described for how to linearize the pressure drop relationship for each pipe in the network by first bounding the range of flow rates which will be encountered in each pipe segment. In accordance with exemplary embodiments of the present invention, the linearized pressure drop models are used to calculate a network flow solution. Although the linearized pressure drop models fit the nonlinear models as well as possible, there will still be some error in the pressure estimates in the network flow solution relative to the pressures that would actually exist in the network given the flows from the network flow solution and the true nonlinear pressure drop relationships. To accommodate this error while still ensuring that pressure constraints are satisfied by the network flow solution, it is necessary to bound the error in the linearized pressure prediction at each node in the network.

To bound the error in the pressure prediction at each node in the network, the error in the prediction of the pressure drop for each arc is bound. For pipe arcs, this is done by finding the maximum absolute difference between the linear pressure drop model and the nonlinear pressure drop model in the bounded range of flows for the pipe segment. By definition, $$ps_j^{err} = \underset{q_j^{min} \leq q \leq q_j^{max}}{\max} |\alpha_j q |q| - m_j^* q - b_j^*| \, \forall \, j \in P.$$

For control arcs, the maximum error in the prediction of the change in pressure associated with the arc depends on the type of arc. Some control elements, such as valves in parallel with variable speed compressors, have the capability to arbitrarily change the pressure and flow of the fluid within certain ranges, and for these there is no error in the pressure prediction. Other types of control elements, such as nonlinear valves, may be represented by a linear relationship between pressure drop and flow based on the set valve position. For these, there may be a potential linearization error similar to that for pipes. In what follows, it is assumed without loss of generality that $ps_j^{err}=0 \ \forall j \in C$.

Next, a known reference node r in the network is identified. This is typically a node where the pressure is known with some bounded error. Typically, the reference node is a node which is incident from a pressure control element arc. The maximum absolute pressure error for the reference value may be equal to zero, or it may be some small value associated with the pressure tracking error associated with the pressure control element.

To compute the error associated with nodes in the network other than the reference node, the undirected graph representing the pipeline network is converted to a weighted graph, where the weight associated with each pipeline arc is the maximum absolute pressure error for the pipe segment. The shortest path is then found, in the weighted graph, between the reference node and any other target node.

In a shortest-path problem, a weighted, directed graph $G=(N,A)$, with weight function w: $A \to R$ mapping arcs to real-valued weights is used. The weight of path $p=\langle n_0, n_1, \ldots, n_k \rangle$ n is the sum of the weights of its constituent arcs:

$$w(p) = \sum_{i=1}^{k} w(n_{i-1}, n_i).$$

The shortest-path weight from n to m is defined by:

$$\delta(m, n) = \begin{cases} \min\{w(p): m \xrightarrow{p} n\} & \text{if there is a path from } m \text{ to } n \\ \infty & \text{otherwise.} \end{cases}$$

A shortest-path from node m to node n is then defined as any path p with weight $w(p)=\delta(m,n)$.

In the weighted graph used here, the weight function is the maximum absolute pressure prediction error associated with the pipe segment connecting the two nodes. To compute the shortest-path weight $\delta(m,n)$, an implementation of Dijkstra's algorithm can be used (see Ahuja, R. K., Magnanti, T. L., & Orlin, J. B. (1993), Network flows: theory, algorithms, and applications.) The maximum pressure error for the target node is the maximum pressure error for the reference node plus the shortest path distance between the reference node and the target node. In mathematical notation, $$ps_m^{err} = ps_r^{err} + \delta(r,m)$$

where the weight function for the shortest path is $w_j = ps_j^{err}$.

If a pipeline network has more than one pressure reference node $r_1, \ldots, r_n$, then one calculates the shortest path between each reference node and every other reference node. The pressure error is then bounded by the maximum of the quantity $ps_r^{err} + \delta(r,m)$ over all reference nodes:

$$ps_m^{err} = \max_{r \in \{r_1, \ldots, r_n\}} \{ps_r^{err} + \delta(r, m)\}.$$

If the errors for the reference nodes are bounded, then this conservative definition, in conjunction with a linear program introduced below, ensures that a network flow solution will satisfy pressure constraints in the pipeline network.

In some pipeline networks with multiple reference pressures, it may not be possible to strictly bound the pressure error associated with one or more reference pressures. Or, it may be that the potential error range associated with a reference node is so large that it is not feasible to find a network flow solution at all if this bound is used. In these cases, it may still be possible to meet pressure constraints probabilistically, if a probability distribution for the pressure error associated with the reference nodes is known. Here, instead of an upper bound on the pressure error associated with a reference node, a bound associated with some confidence level is used, for example a 95th percentile. The bound is defined as the value such that, 95% of the time, the absolute error in the pressure associated with that node is less than $ps_r^{err\ 95\%}$.

$$ps_m^{err} = \max_{r \in \{r_1, \ldots, r_n\}} \{ps_r^{err\ 95\%} + \delta(r, m)\}.$$

Figure 9:
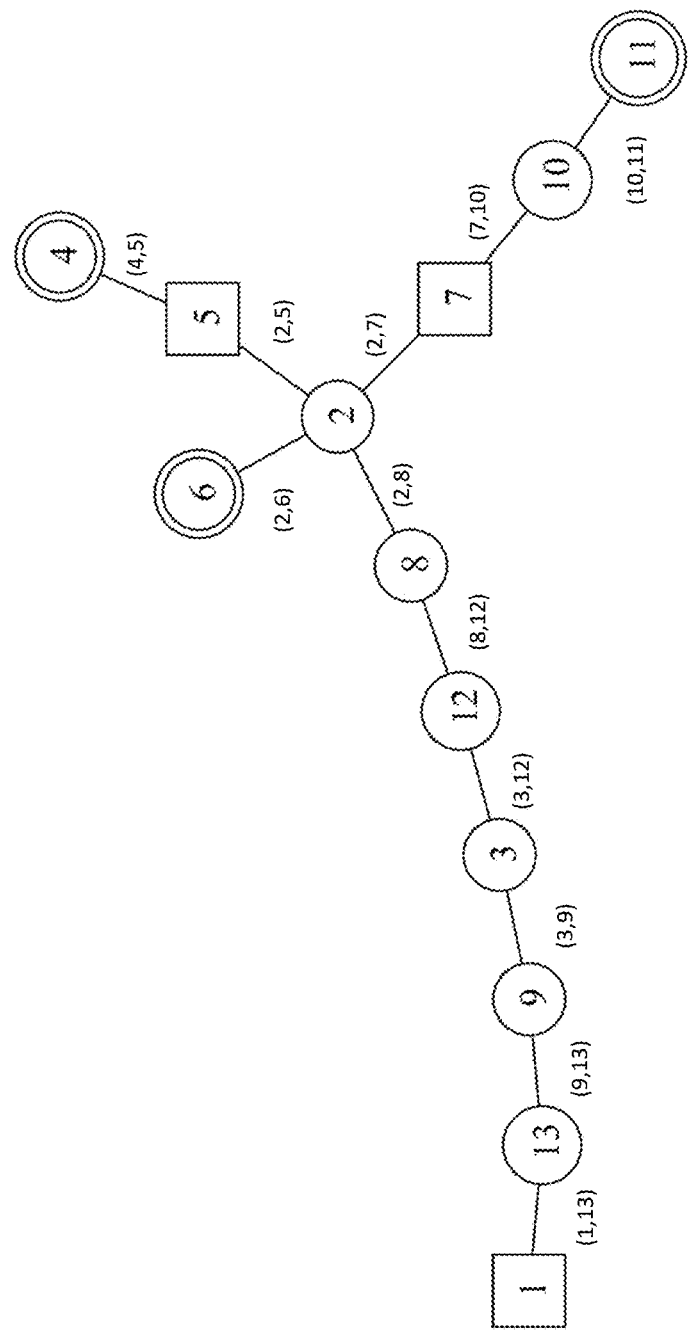
FIG. 9 depicts a pipeline network which is used to illustrate how pressure prediction errors are calculated for each network node.
Figure 10:
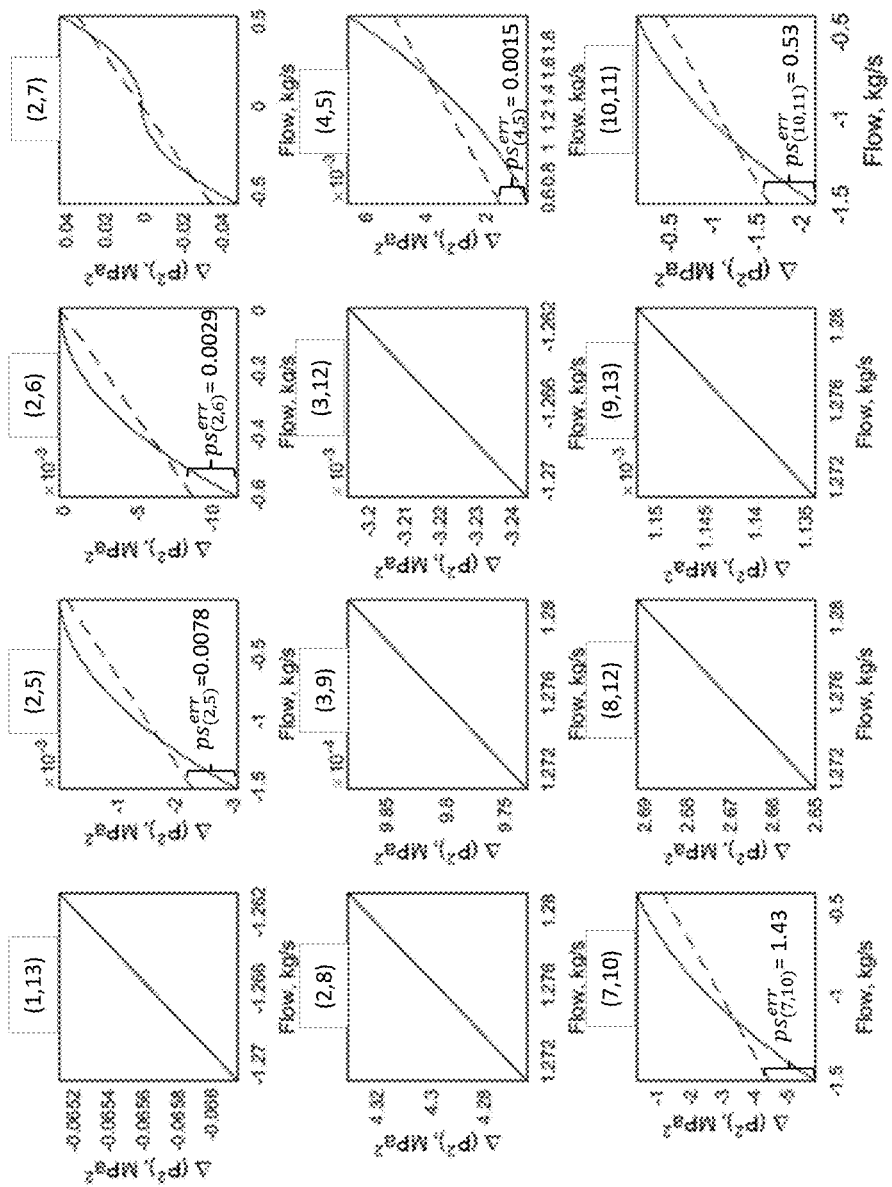
FIG. 10 illustrates identifying the maximum error in predicted pressure drop for each pipe segment.

FIG. 9 is an unsigned graph representing a gas pipeline network which is used for the purpose of illustrating how to bound the error associated with linearized pressure drop models. Double circle nodes represent production plants, square nodes represent customers, and single circle nodes represent pipeline junctions. The arcs connecting the nodes are labeled. In this example, the network bisection method is used to bound the flow rate in each pipe segment, and then a least-squares linear model is fitted to the nonlinear pressure drop relationship. The nonlinear pressure drop relationship for each pipe (a solid line), along with the least squares linear fit for each pipe is shown in plots (as FIG. 10) for each of the pipe segments. FIG. 10 also graphically depicts the maximum squared pressure drop error between the linear and nonlinear relationship.

Figure 11:
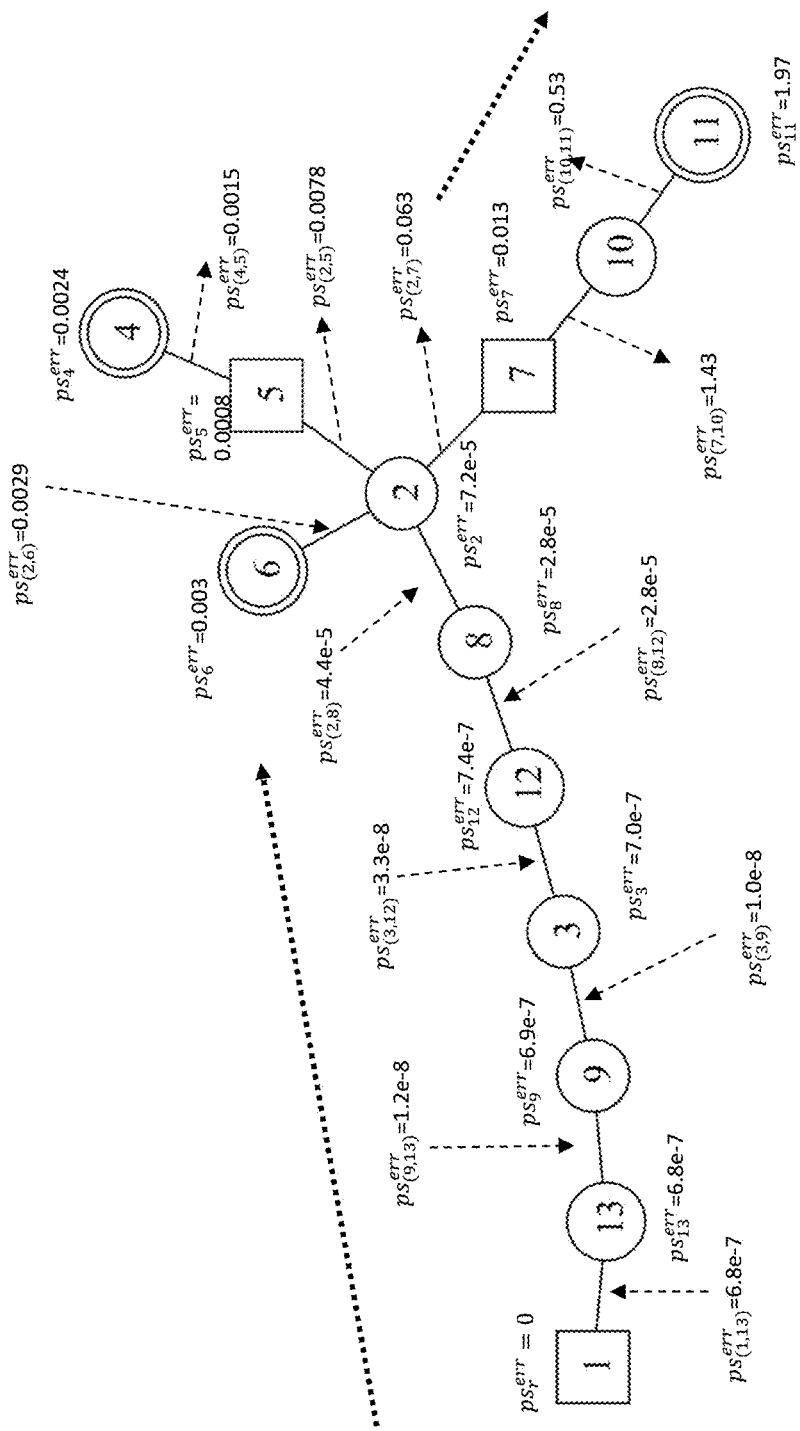
FIG. 11 shows propagating pressure prediction errors from the reference node to all other nodes in the network.

FIG. 11 shows the results of the application of Dijkstra's method to calculate the maximum pressure prediction error for each of the pipeline nodes, given the bounded error for each of the pipe arcs.

Calculating a Network Flow Solution

Above it is described how to 1) bound the minimum and maximum flow rate for each pipe segment in a computationally efficient fashion; 2) compute an accurate linear approximation of the nonlinear pressure drop relationship given the bounded flow range; 3) bound the pressure prediction error associated with the linear approximation. Next described is how to calculate a network flow solution, that is, to determine values of pressures for pipeline junctions and flows for pipeline segments which 1) satisfy constraints associated with the conservation of mass and momentum; 2) are consistent with bounds on the flow delivered to each customer, 3) satisfy pipeline pressure constraints with appropriate margin to accommodate errors associated with the linearization of the nonlinear pressure drop relationship. The governing equations are summarized here.

Node Mass Balance

The node mass balance stipulates that the total mass flow leaving a particular node is equal to the total mass flow entering that node.

$$d_n + \sum_{j|(n,j) \in A_{in}} q_j = \sum_{j|(n,j) \in A_{out}} q_j + s_n$$

Node Pressure Continuity

The node pressure continuity equations require that the pressure of all pipes connected to a node should be the same as the pressure of the node.

$$ps_j^{in} = ps_n^{node} \forall (n,j) \in A_{in}$$

$$ps_j^{out} = ps_n^{node} \forall (n,j) \in A_{out}$$

Linearized Pressure Drop Mode

It is shown how to develop a linear pressure drop model of the form:

$$ps_j^{in} - ps_n^{out} = m_j q_j + b_j.$$

Pressure Constraints at Nodes

At nodes in the pipeline network, there are minimum and maximum pressure constraints. These constraints must be satisfied with sufficient margin, namely $ps_n^{err}$, to allow for potential inaccuracy associated with the linearized pressure drop relationships:

$$ps_n^{min} + ps_n^{err} \leq ps_n^{node} \leq ps_n^{max} - ps_n^{err}, \forall n \in N.$$

This ensures that the pressures constraints will be satisfied even when the nonlinear pressure drop model is used to calculate network pressures based on the flow values associated with the network flow solution. Above, it is shown how to compute $ps_n^{err}$ using Dijkstra's algorithm for a certain weighted graph.

Production Constraints

This constraint specifies the minimum and maximum production rate for each of the plants.

$$s_n^{min} < s_n < s_n^{max}$$

Finally, the following linear program can be formulated to find a network flow solution:

Given

| | |
|---|---|
| $d_n \forall n \in N$ | Demand rate in node n |
| $(m_j, b_j) \forall j \in P$ | Linearized pressure drop model for pipe j |
| $ps_n^{err} \forall n \in N$ | Maximum squared pressure error for node n, given linearized pressure drop models |
| $s_n^{min} < s_n < s_n^{max}$ | Minimum and maximum production rates at node n |

Calculate

| | |
|---|---|
| $q_j \forall j \in A$ | Flow rate in arcs |
| $s_n \forall n \in S$ | Production rate in supply node |
| $d_n \forall n \in D$ | Rate supplied to demand node |
| $ps_n^{node} \forall n \in N$ | Squared pressure at each node |
| $ps_j^e \forall j \in A$ | Squared pressure at the ends of each arc |

Such that

| | |
|---|---|
| $d_n + \Sigma_{j|(n,j) \in A_{in}} q_j = \Sigma_{j|(n,j) \in A_{out}} q_j + s_n \forall n \in N$ | Node mass balance |
| $ps_j^{in} = ps_n^{node} \forall (n,j) \in A_{in}$ | Node pressure equality constraints |
| $ps_j^{out} = ps_n^{node} \forall (n,j) \in A_{out}$ | Node pressure equality constraints |
| $ps_j^{in} - ps_j^{out} = m_j q_j + b_j \forall j \in P$ | Linearized pressure drop model for pipes |
| $ps_n^{min} + ps_n^{err} \leq ps_n^{node} \leq ps_n^{max} - ps_n^{err}, \forall n \in N$ | Pressure bounds with margin for error |
| $s_n^{min} < s_n < s_n^{max} \forall n \in S$ | Production bounds |

The above linear program can be quickly solved by a wide variety of linear programming solvers, including those in MATLAB, Gurobi, or CPLEX. Note that additional linear constraints, such as min or max flow rates in certain arcs, can be added to the above linear program. In addition, an objective function can be added such that a single unique flow solution can be identified based on criteria such as economic considerations.

Controlling the Gas Pipeline Network Using the Network Flow Solution

Once the network flow solution has been computed, it can be used to control the gas pipeline network. Flow control elements (e.g., such as those illustrated with reference to FIG. 1A) receive setpoints which are identified using the network flow solution. There are two representations of flow control elements in the undirected graph representation of the network. First, nodes associated with supply or demand are control elements, and the network flow solution indicates the supply or demand flow that should be associated with each plant or customer in the network. Second, in some networks, there are also control arcs (representing compressors, valves, or a combination of compressors in valves). The network flow solution indicates the flows and pressures that should be accomplished by these control elements.

Embodiments of the invention are illustrated in the following examples.

Example 1

This example is small enough that extensive detail can be provided. In this example, there are three customers and three plants. In the network diagram of FIG. 12, customers are represented as squares and plants are represented as double circles.

Parameters for each of the eight nodes in the network are shown in Table 1. For the customer demand nodes, the minimum acceptable pressure is 2 Pa (corresponding to a squared pressure of 4 Pa$^2$). For the plant supply nodes, the maximum acceptable pressure is 5 Pa (corresponding to a squared pressure of 25 Pa$^2$). The table shows that the demand for the customer at node 1 is 0.449 kg/s; the demand for the customer at node 4 is 0.208 kg/s; and the demand for the customer at node 6 is 1.06 kg/s. The table also shows that the gas production plant located at node 3 can range from 0 to 0.597 kg/s; the gas production plant located at node 5 can produce between 0.546 kg/s and 1.135 kg/s; and the gas production plant located at node 7 can produce between 0 and 0.530 kg/s.

TABLE 1

Parameters for the nodes for Example 1

| n | $d_n$, kg/s | $s_n^{min}$, kg/s | $s_n^{max}$, kg/s | $ps_n^{min}$, Pa$^2$ | $ps_n^{max}$, Pa$^2$ | $ps_n^{err}$, Pa$^2$ |
|---|---|---|---|---|---|---|
| 1 | 0.449 | 0 | 0 | 4 | Inf | 0 |
| 2 | 0 | 0 | 0 | 0 | Inf | 6.34E−06 |
| 3 | 0 | 0 | 0.597 | 0 | 25 | 1.41E−02 |
| 4 | 0.208 | 0 | 0 | 4 | Inf | 0.014061 |
| 5 | 0 | 0.5461 | 1.135 | 0 | 25 | 0.00774 |
| 6 | 1.063 | 0 | 0 | 4 | Inf | 8.01E−06 |
| 7 | 0 | 0 | 0.530 | 0 | 25 | 7.55E−02 |
| 8 | 0 | 0 | 0 | 0 | Inf | 0.074674 |

Figure 12:
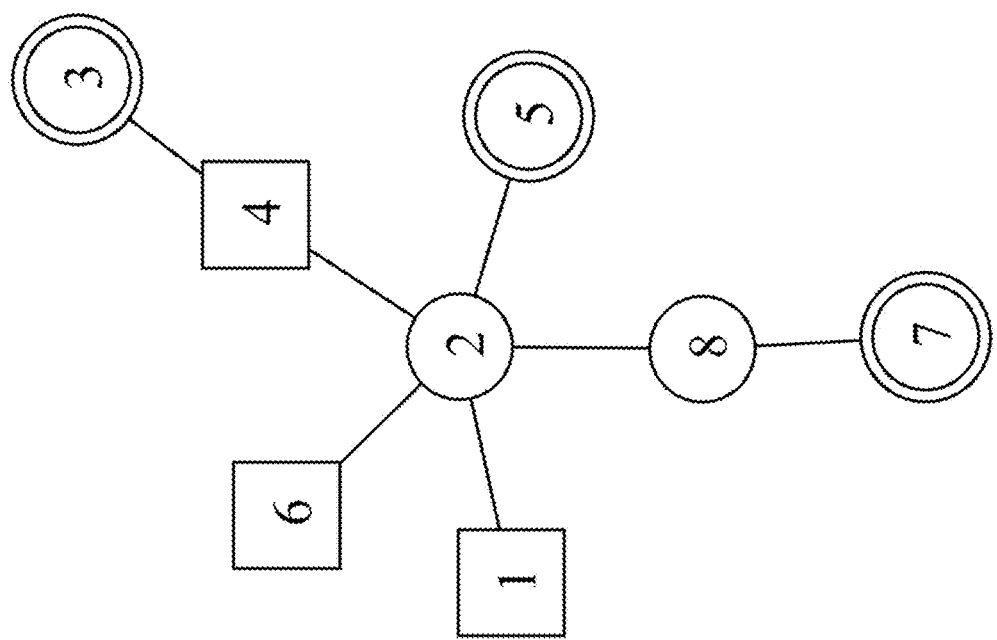
FIG. 12 illustrates the flow network for example 1.
Figure 13:
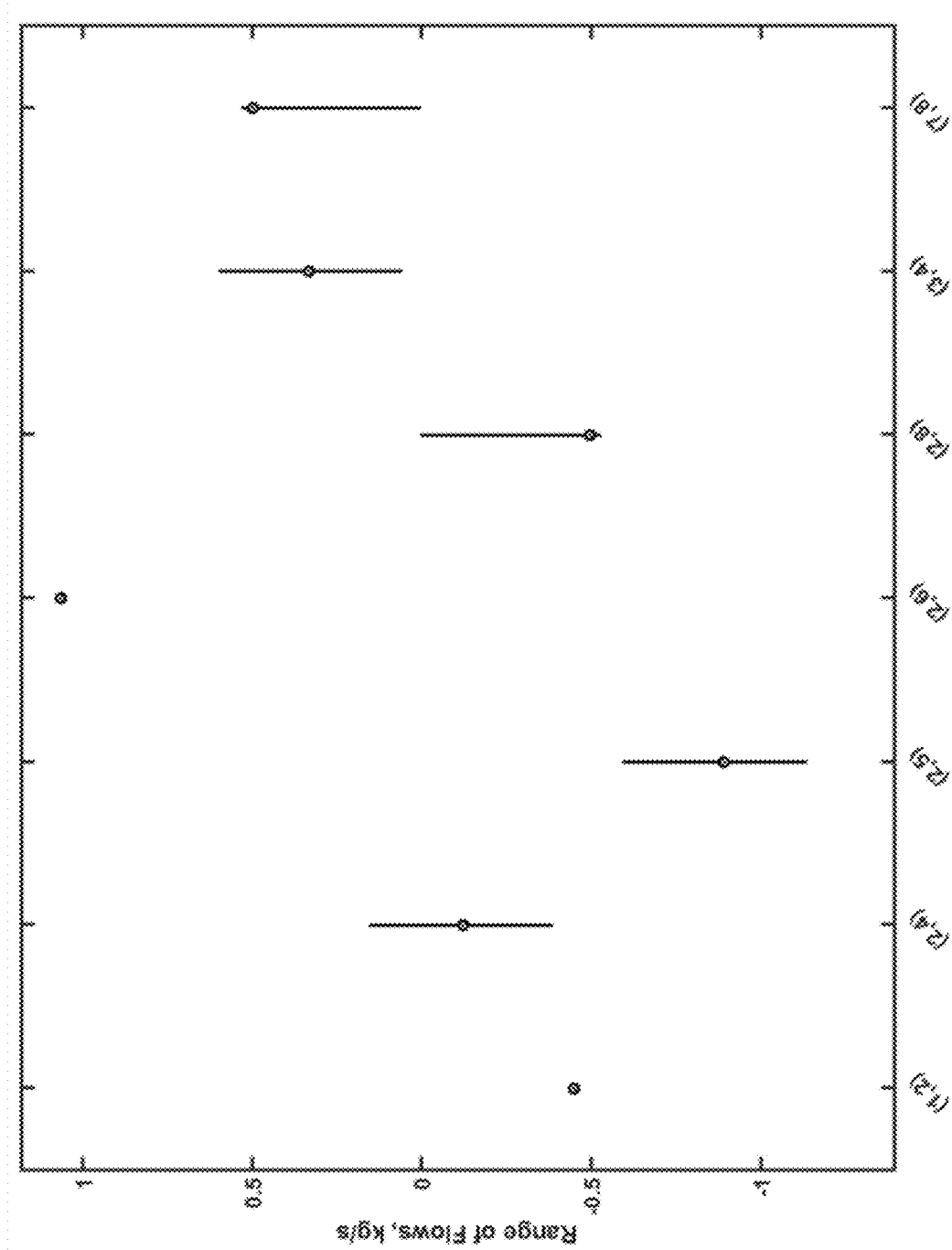
FIG. 13 shows bounds on the signed flow rate for each pipeline segment for example 1.
Figure 14:
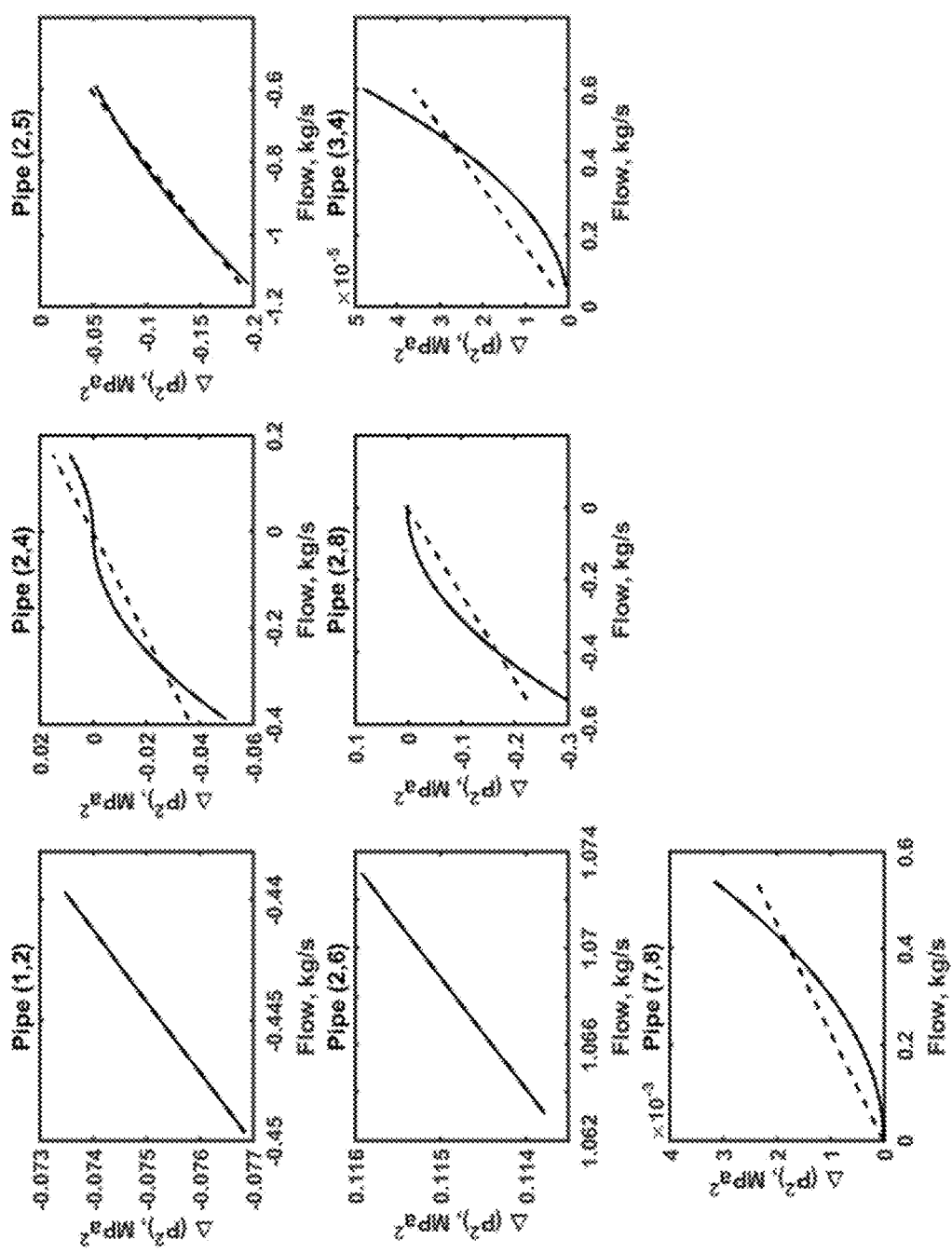
FIG. 14 illustrates linearizing the pressure drop relationship between the minimum and maximum signed flow rate for each pipe segment.

The first step in the exemplary implementation of the invention is to bound the flow rate in each of the pipe segments, using the graph layout shown in FIG. 12, the information in Table 1, and the network bisection method described in detail above. The results are shown in FIG. 13, which displays the range of possible flows for each arc in the graph. By convention, the "inlet" for each pipe is at the lower numbered node on which it is incident, and the "outlet" for each pipe is at the higher numbered node on which it is incident. As a result, by convention, flows are indicated as negative if the flow is going from a higher numbered node to a lower numbered node.

Note that FIG. 13 shows that the flow in arc (1,2) is −0.449 kg/s, and the flow in arc (2,6) is 1.063 kg/s, with no potential for any other flow value. This is because node 1 is a customer demand node of degree 1, with a customer with demand 0.449 kg/s; and node 6 is a customer demand node of degree 1, with a customer demand of 1.063 kg/s. For all other arcs in the network, there is a potential range of flows indicated by the vertical bar.

The next step in an exemplary implementation of the invention is to linearize the nonlinear pressure drop relationship for each pipe segment in the network. The results of the linearization are shown in FIG. 10. Each subgraph shows a range of flows for a particular pipe segment (on the x-axis), with the corresponding change in squared pressure (on the y-axis). The solid plot line shows the nonlinear pressure drop relationship, and the dashed line shows the least-squares linear fit of the nonlinear pressure drop relationship over the flow range.

Key parameters are results associated with the arcs in the undirected graph are shown in Table 2. The table shows the length and diameter of each pipe segment, as well as the nonlinear pressure drop coefficient α. The table also shows the slope and intercept associated with the linearization of the nonlinear pressure drop relationship. Note that for some arcs, such as (2,4), (2,8), (3,4), and (7,8), there is slope-only line; whereas for the arcs (1,2), (2,5), and (2,6) there is a slope-intercept line.

Once flow rates in each pipe segment have been bounded, and the linearized pressure drop model for each pipe has been created, the next step is to bound the potential pressure prediction error associated with the linearization. The maximum absolute pressure drop error for the pipe segments is shown in fifth column of Table 2, and the maximum absolute pressure error for network nodes is shown in the seventh column of Table 1.

Next, a network flow solution is computed using the linear program:
Given

| | |
|---|---|
| $d_n \ \forall n \in N$ | Demand rate in node n |
| $(m_j, b_j) \ \forall j \in P$ | Linearized pressure drop model for pipe j |
| $ps_n^{err} \ \forall n \in N$ | Maximum squared pressure error for node n, given linearized pressure drop models |
| $s_n^{min} < s_n < s_n^{max}$ | Minimum and maximum production rates at node n |

Calculate

| | |
|---|---|
| $q_j \ \forall j \in A$ | Flow rate in arcs |
| $s_n \ \forall n \in S$ | Production rate in supply node |
| $ps_n^{node} \ \forall n \in N$ | Squared pressure at each node |
| $ps_j^e \ \forall j \in A$ | Squared pressure at the ends of each arc |

Such that

| | |
|---|---|
| $d_n + \Sigma_{j\|(n,j) \in A_{in}} q_j = \Sigma_{j\|(n,j) \in A_{out}} q_j + s_n \ \forall n \in N$ | Node mass balance |
| $ps_j^{in} = ps_n^{node} \ \forall (n,j) \in A_{in}$ | Node pressure equality constraints |
| $ps_j^{out} = ps_n^{node} \ \forall (n,j) \in A_{out}$ | Node pressure equality constraints |
| $ps_j^{in} - ps_j^{out} = m_j q_j + b_j \ \forall j \in P$ | Linearized pressure drop model for pipes |
| $ps_n^{min} + ps_n^{err} \leq ps_n^{node} \leq ps_n^{max} - ps_n^{err}, \ \forall n \in N$ | Pressure bounds with margin for error |
| $s_n^{min} < s_n < s_n^{max} \ \forall n \in S$ | Production bounds |

Figure 15:
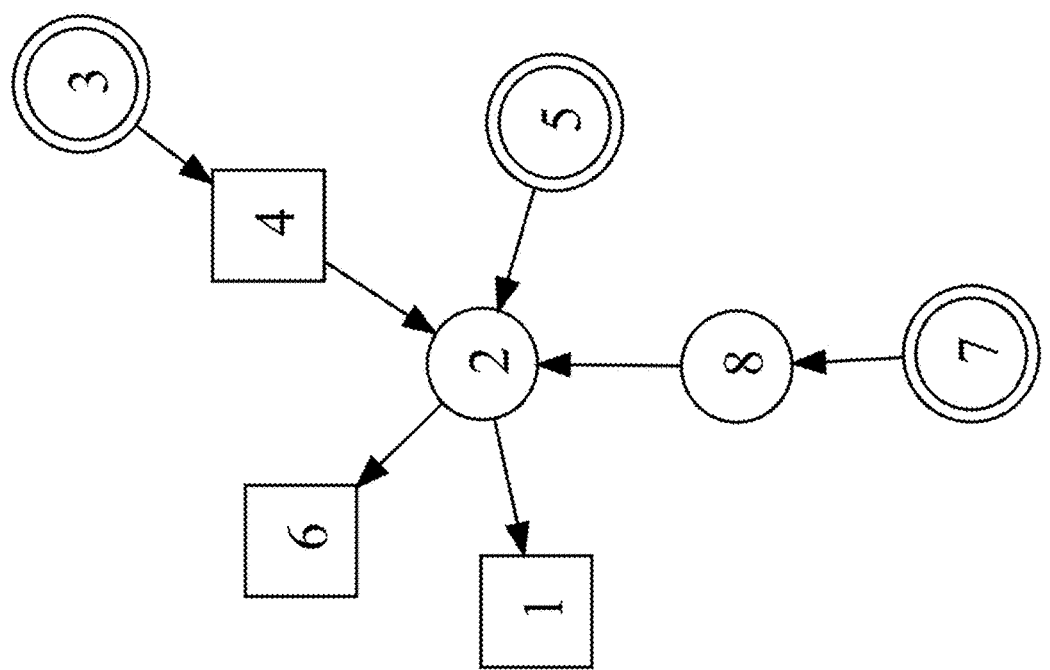
FIG. 15 shows the directions of flows for the network flow solution for example 1.

The results of the linear program include a specification of the flow rate in each pipeline arc, the quantity $q_j$ which is shown in the eighth column of Table 2. The results also include a specification of the production rate at each plant which is required to meet network pressure constraints. FIG. 15 shows the direction of flows in the network from the network flow solution.

Figure 16:
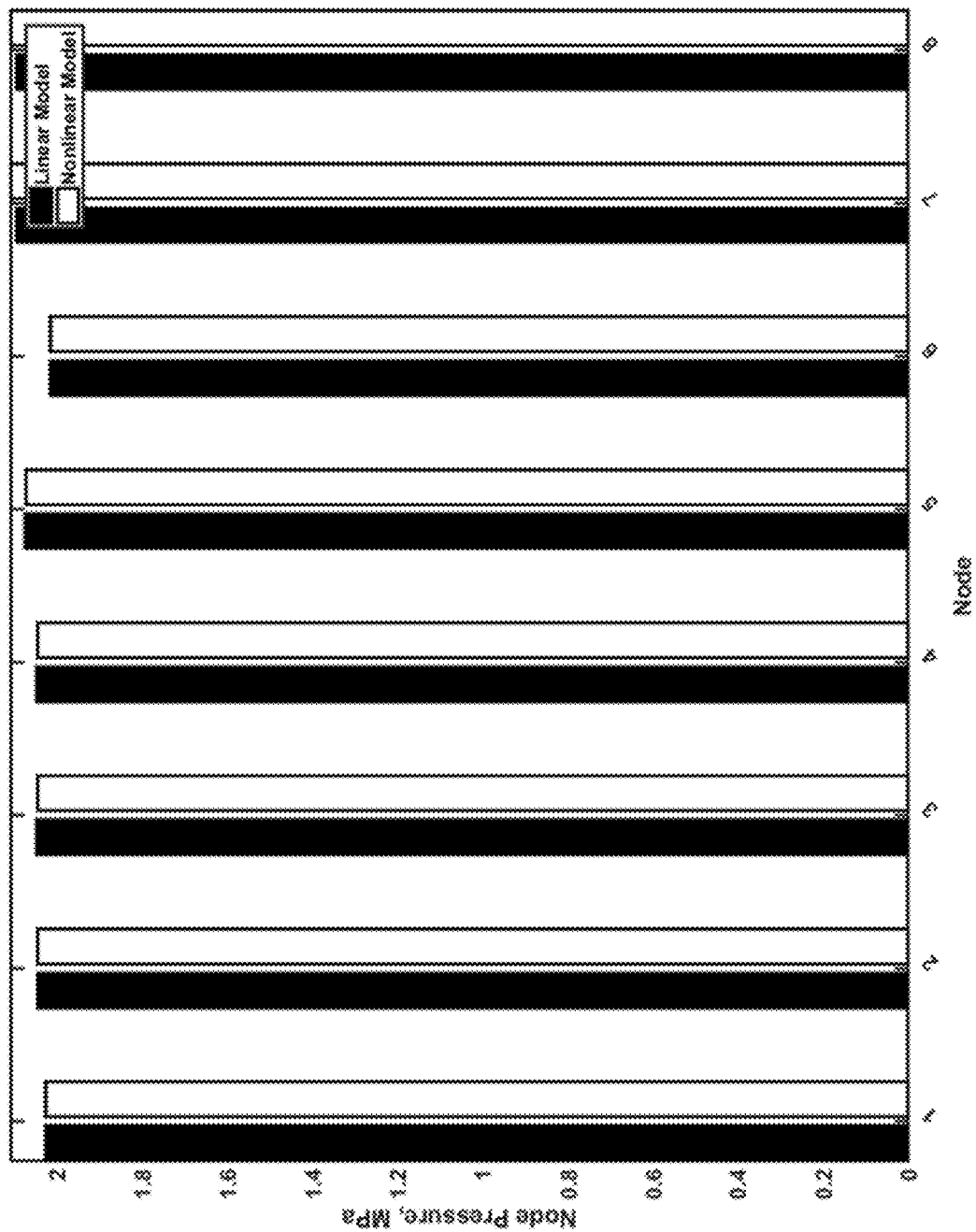
FIG. 16 shows pressures for each node in the pipeline network, as predicted by the linear and nonlinear model for the network flow solution for example 1.
Figure 17:
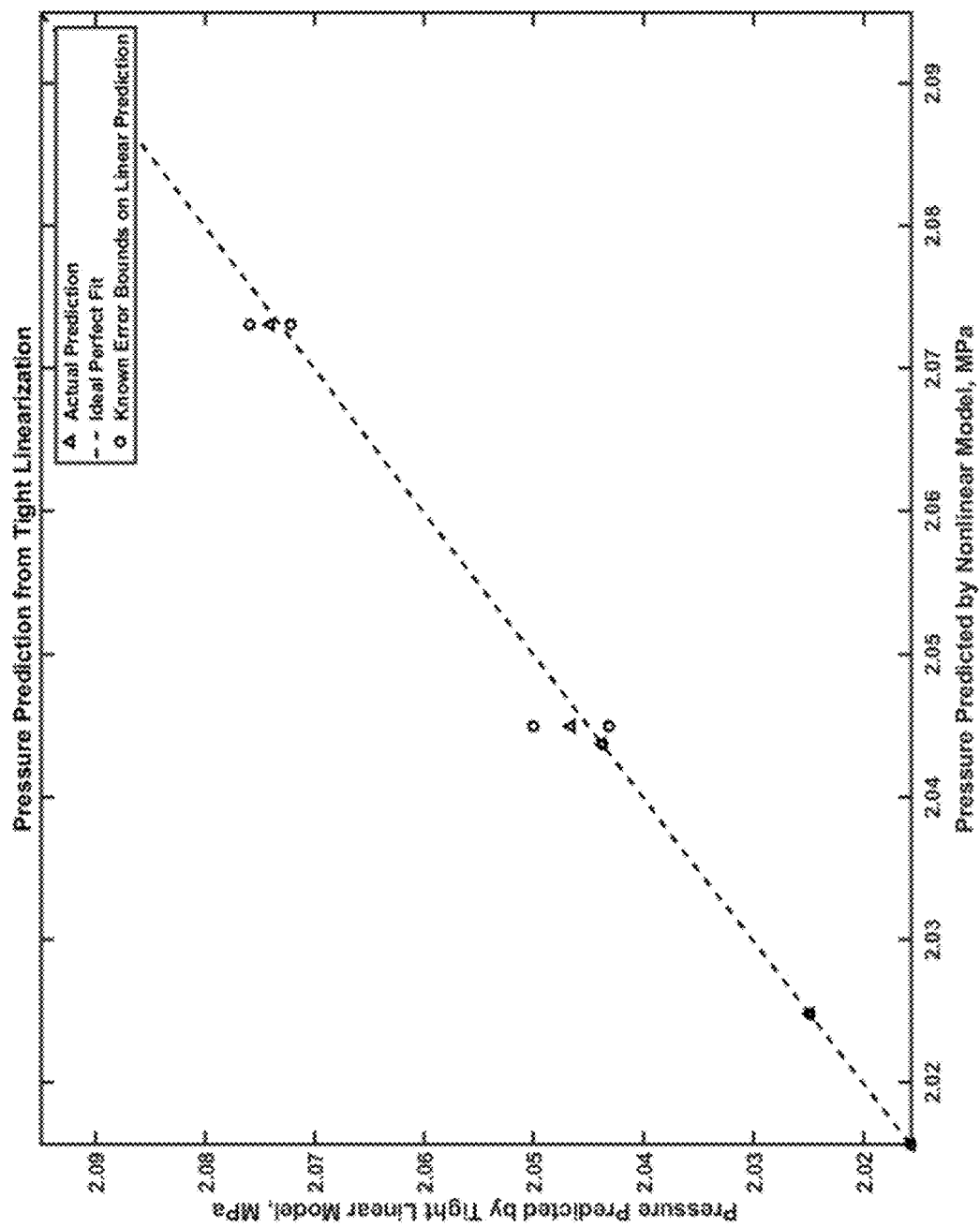
FIG. 17 is a diagram showing that the pressure predictions of the tight linear model agree well with those of the nonlinear model, and that lower bounds on pressure for customer nodes are satisfied.

FIG. 16 and FIG. 17 show that the pressures associated with the linear models in the network flow solution match closely the pressures that would be predicted by the nonlinear models, given the flows from the network flow

TABLE 2

Parameters for the arcs for Example 1

| ID | L, m | D, m | α | $ps_j^{err}$, Pa² | $m_j$ | $b_j$ | $q_j$, kg/s |
|---|---|---|---|---|---|---|---|
| (1,2) | 3983.2 | 0.153 | 0.3801 | 6.34E−06 | 0.338059 | 0.075155 | −0.44964 |
| (2,4) | 3983.2 | 0.157 | 0.3322 | 0.014054 | 0.092901 | 0 | −0.12396 |
| (2,5) | 571.2 | 0.125 | 0.1521 | 0.007734 | 0.261516 | 0.108553 | −0.89205 |
| (2,6) | 378.0 | 0.125 | 0.1007 | 1.68E−06 | 0.215032 | −0.11484 | 1.06315 |
| (2,8) | 3983.2 | 0.125 | 1.0606 | 0.074667 | 0.422114 | 0 | −0.49679 |
| (3,4) | 1.6 | 0.158 | 0.0001 | 1.18E−05 | 5.99E−05 | 0 | 0.332423 |
| (7,8) | 499.9 | 0.206 | 0.0108 | 0.000788 | 0.004399 | 0 | 0.496786 | solution. Furthermore, as shown in FIG. 17, the prior bounds calculated to bound the error associated with the pressure prediction from the linear model do, indeed, contain the pressure that would be calculated from the nonlinear model. This guarantees that the flow solution from the linear program will satisfy the pressure constraints, given the true nonlinear relationship between pressure and flow.

Figure 18:
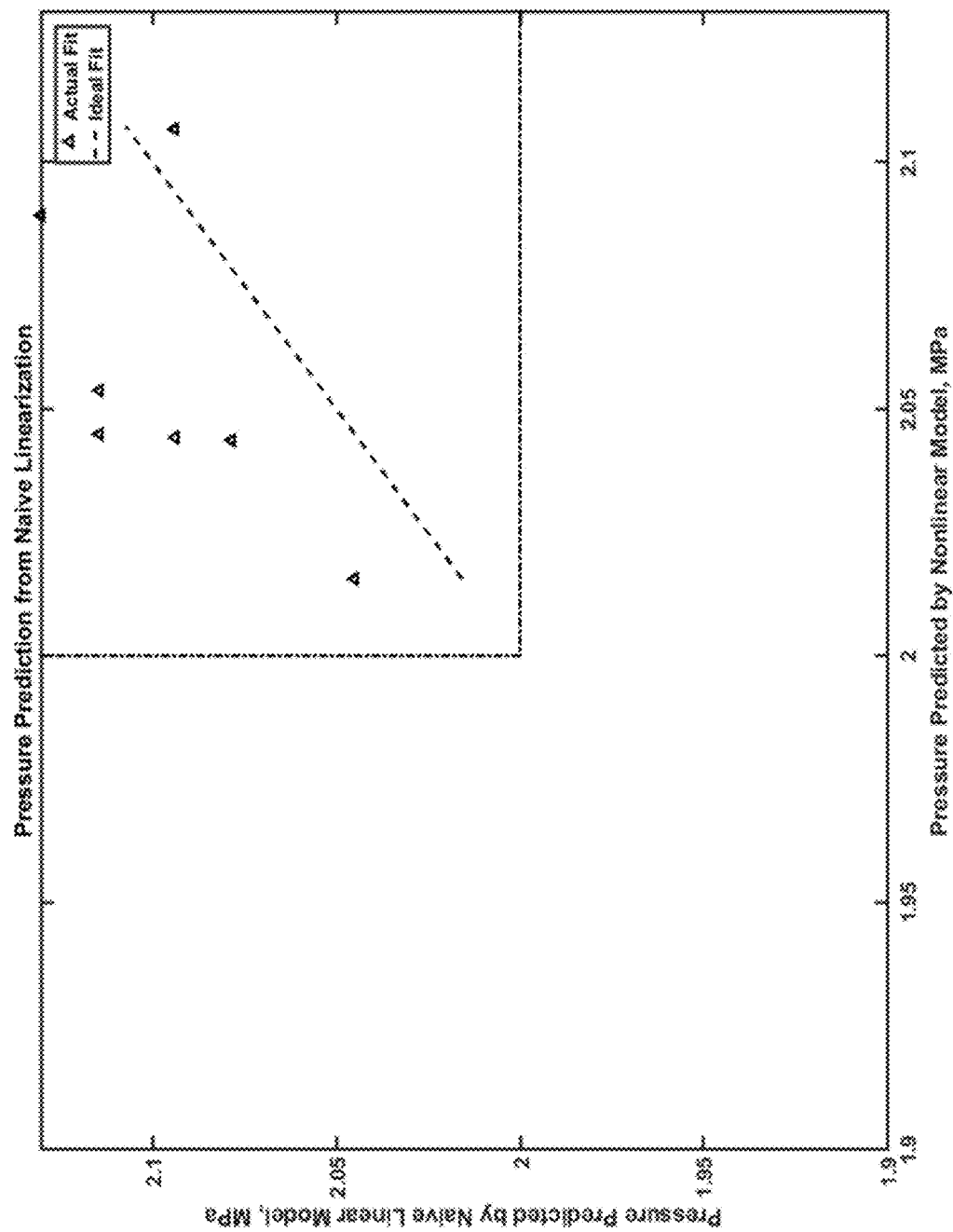
FIG. 18 shows the pressure predictions from a naive linearization for example 1.

Finally, with regard to this example, it can be noted that a more naïve linearization of the pressure drop, such as simply bounding the flow in any pipe based on the total network demand for hydrogen, produces pressure estimates which do not closely match those of the nonlinear model. This result is illustrated in FIG. 18.

Example 2

Figure 19:
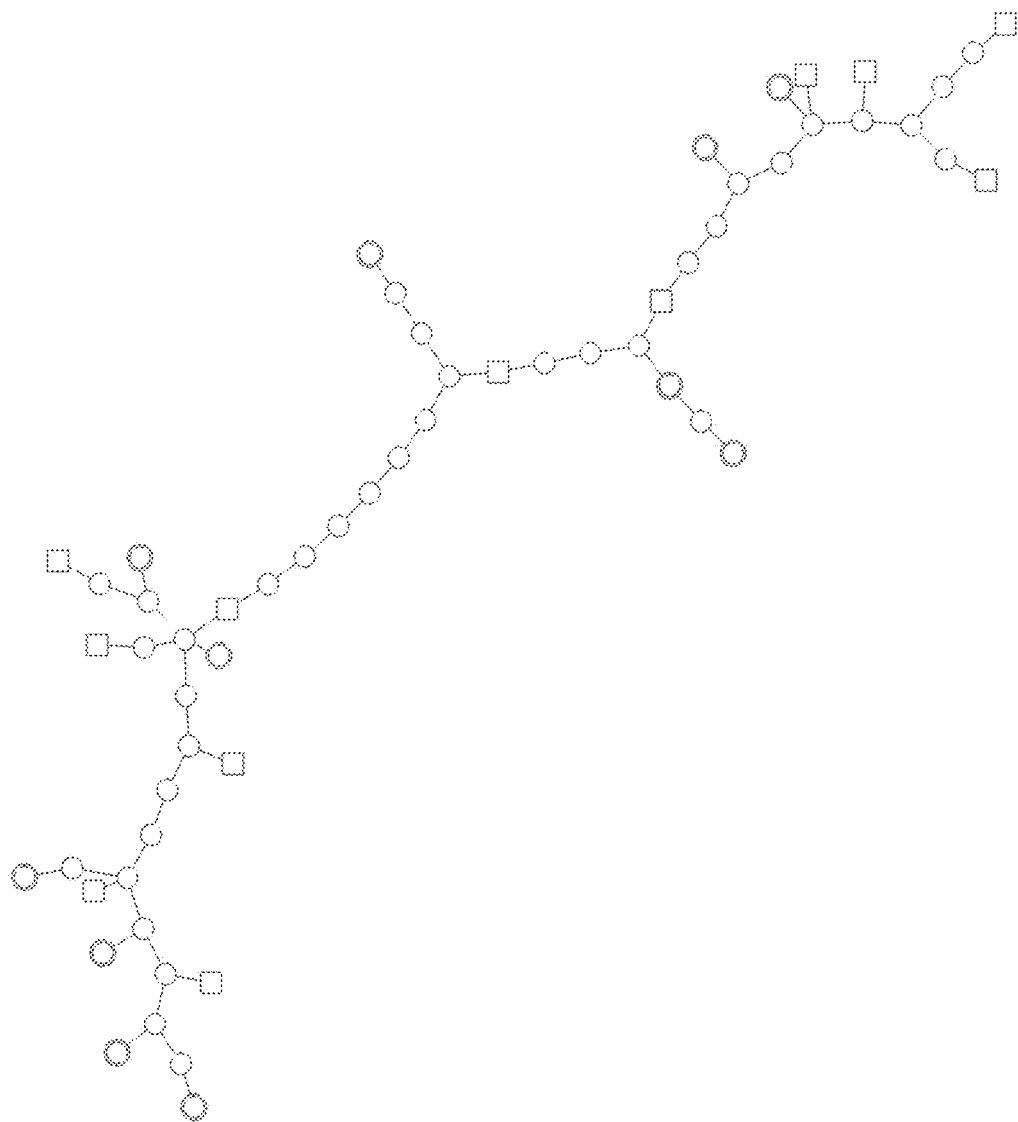
FIG. 19 is an unsigned graph representing the pipeline network for example 2.

In this example, the undirected graph which represents the layout of the pipeline network for this example is shown in FIG. 19, where squares represent demand nodes and double circles represent supply nodes.

Figure 20:
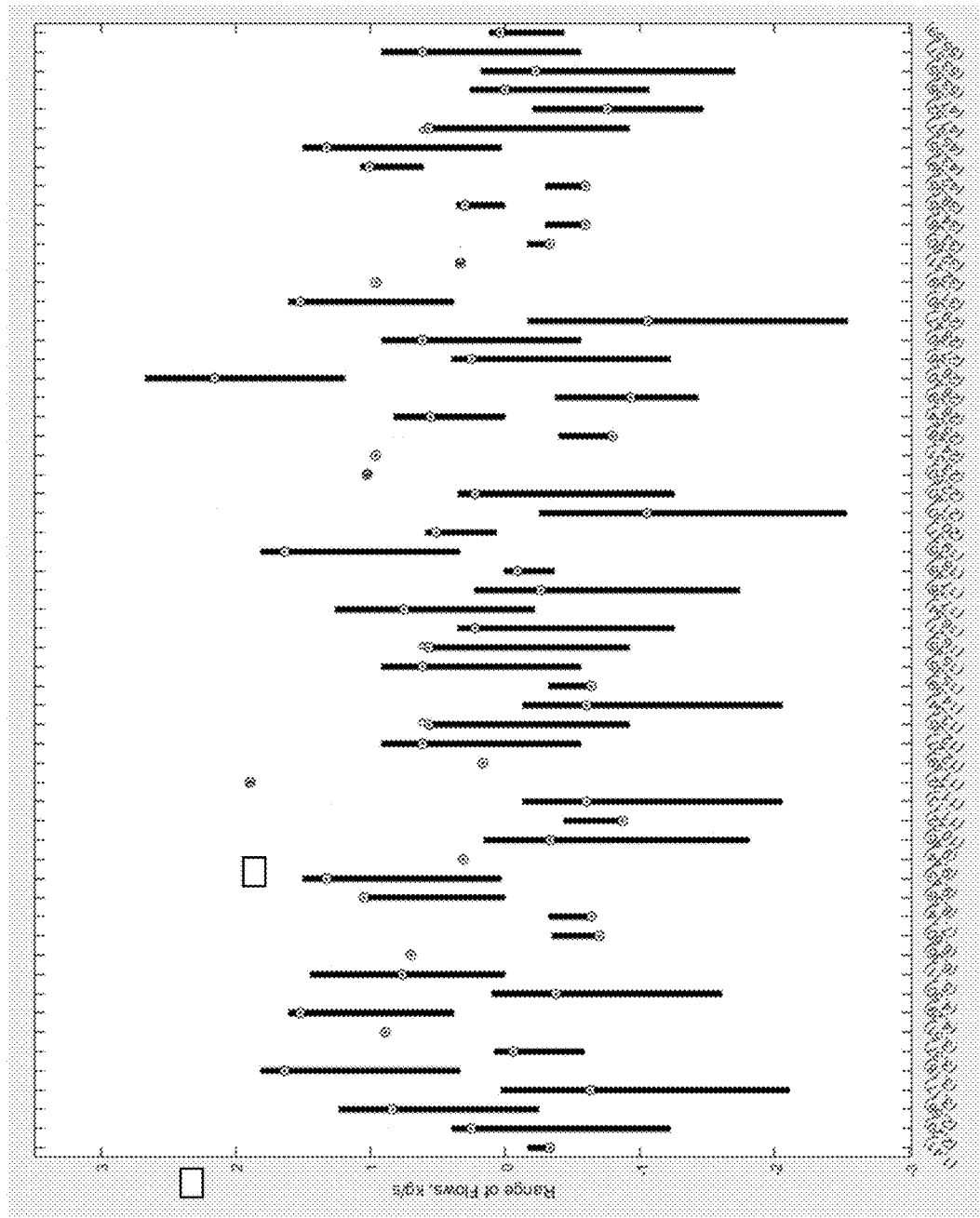
FIG. 20 shows bounds on the signed flow rate for each pipe segment in example 2.
Figure 21:
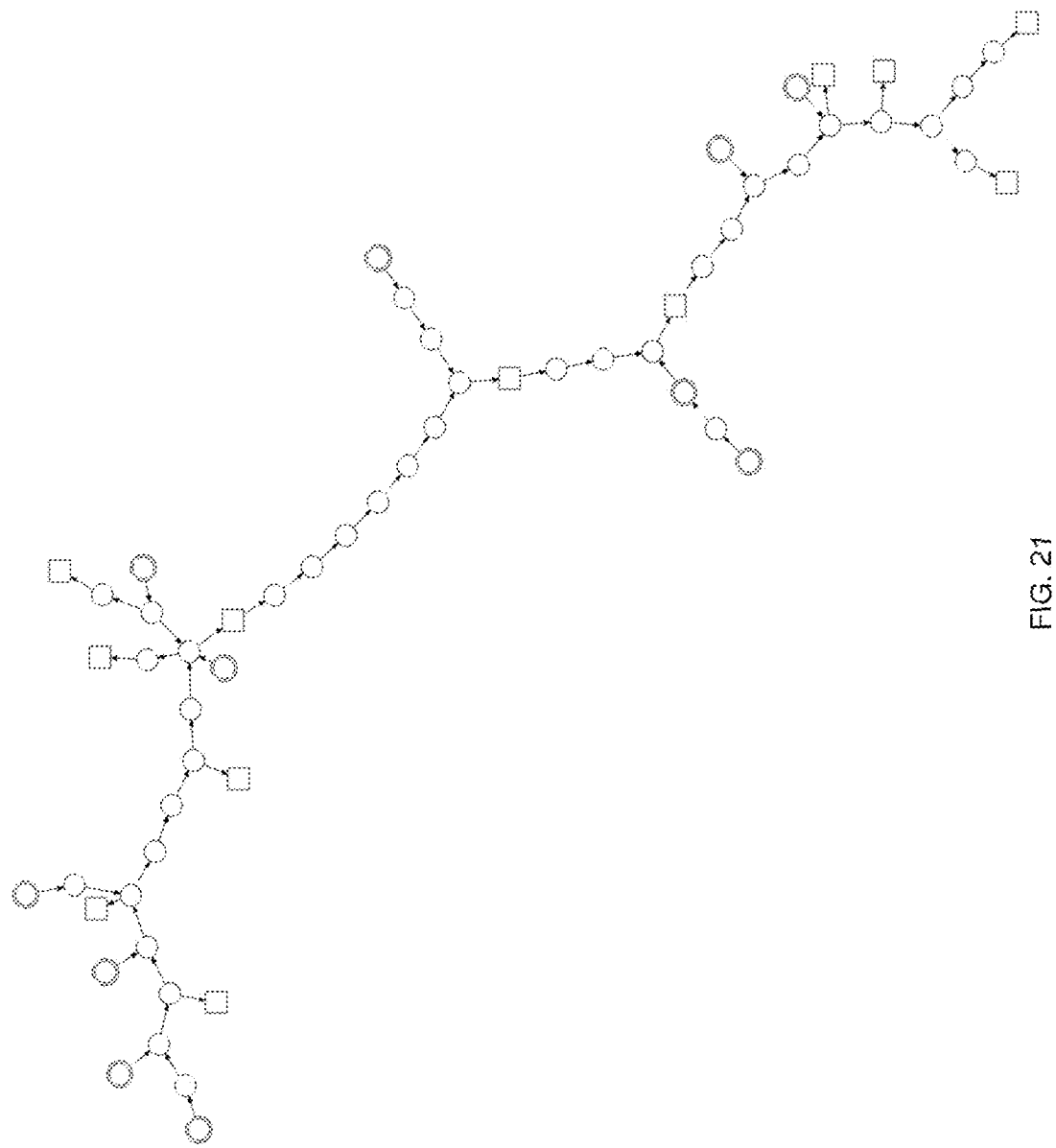
FIG. 21 shows the directions of flows in pipe segments for the network flow solution of example 2.

Using the network bisection method, the flow rate in each pipe segment is bounded. The results are shown in FIG. 20. The nonlinear pressure drop models were linearized, the pressure prediction errors were bounded, and a network flow solution was created. The flow directions established by the network flow solution are illustrated in FIG. 21.

Figure 22:
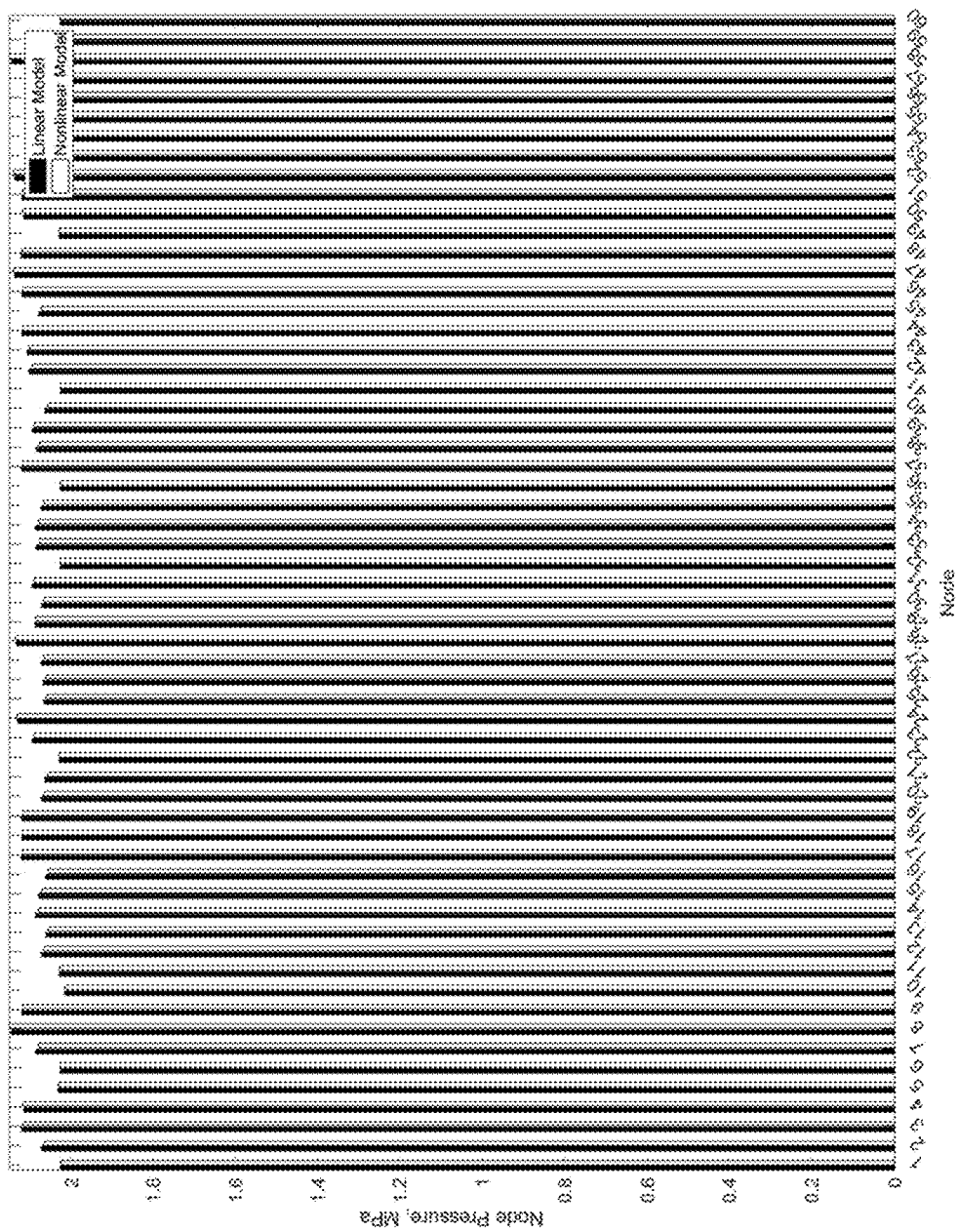
FIG. 22 shows the agreement between the pressures of the network flow solution, and those calculated from the flow rates of the network flow solution using a nonlinear model, for example 2.
Figure 23:
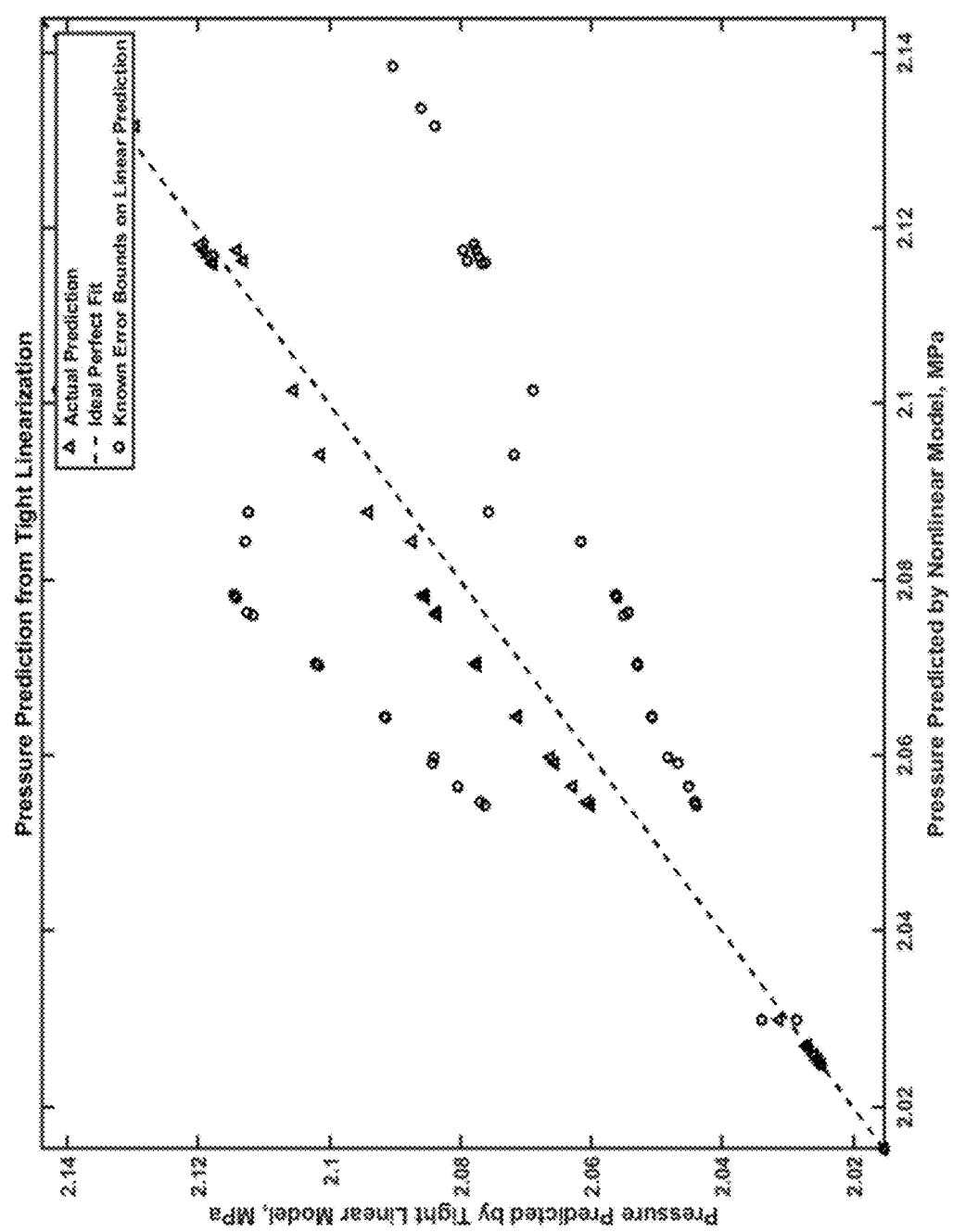
FIG. 23 shows the agreement between the linearized model and the nonlinear model, as well as bounds on the error of the linear model, for example 2.

As shown in FIG. 22, there is an excellent match between the pressures produced by the linearized pressure drop model and those that would be calculated from the nonlinear model, given the flows of the network solution. FIG. 23 shows the agreement between the linear model and the nonlinear model in a different form. In every case, the error bounds for the linear model span the pressure that would be predicted from the nonlinear pressure drop model.

Figure 24:
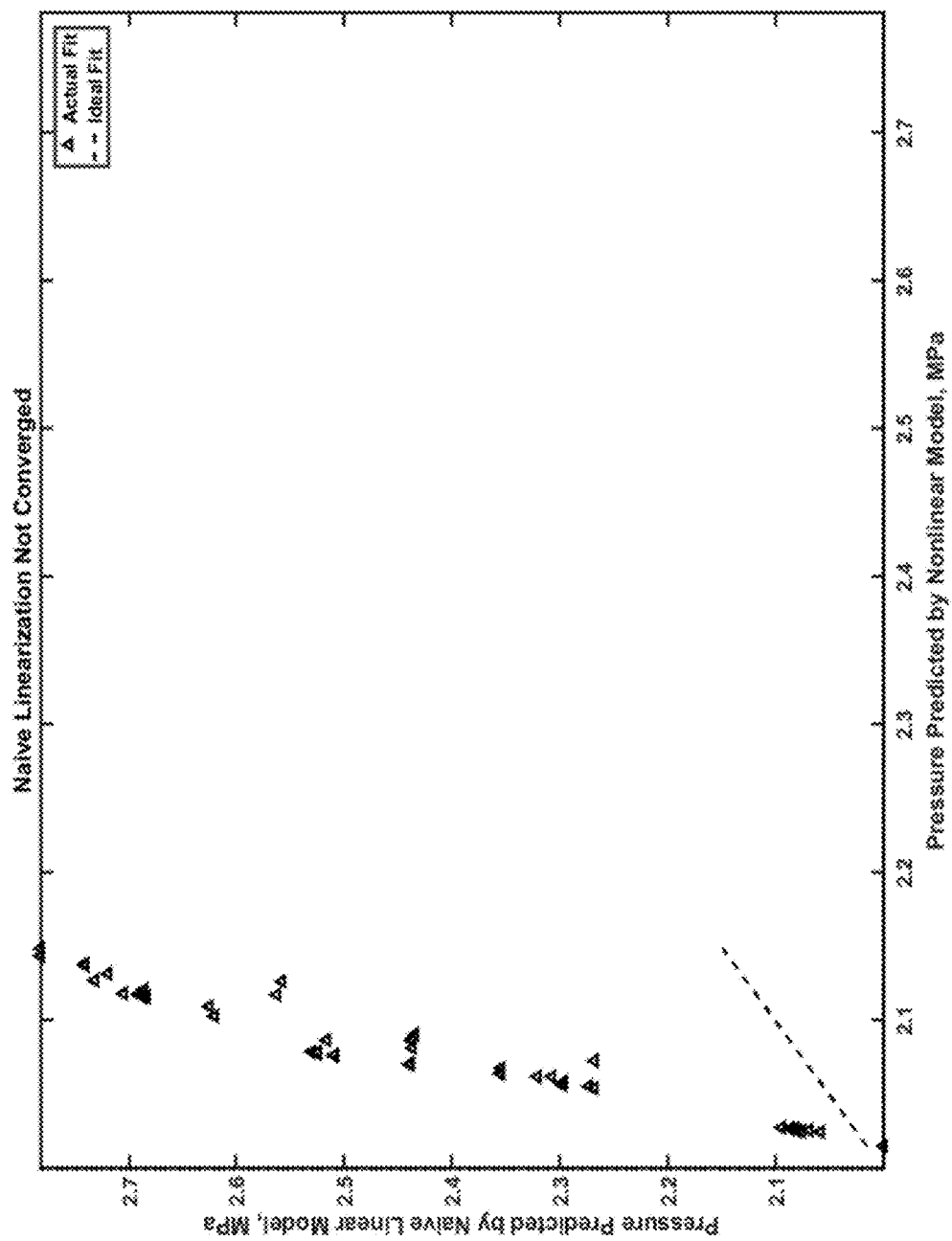
FIG. 24 shows that the pressure predictions resulting from a naïve linearization do not match the pressure estimates produced by a nonlinear model.
Figure 25:
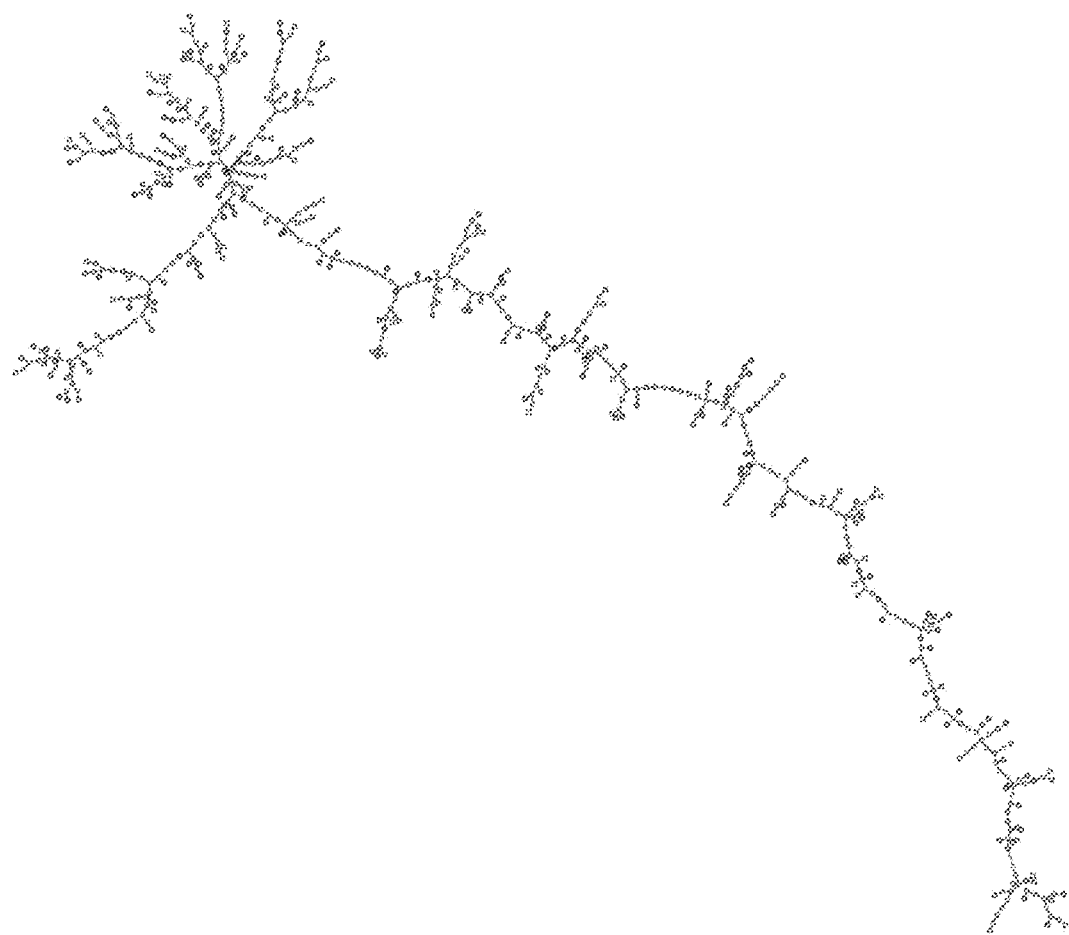
FIG. 25 is an undirected graph representing the pipeline network of example 3.

A naïve linearization of the nonlinear pressure drop relationship, based on linearizing the pressure drop relationship across a wide flow range, is not able to produce a network flow solution that meets pressure constraints. As shown in FIG. 24, the naïve linear model tends to greatly overpredict pressure drops.

Example 3

Figure 26:
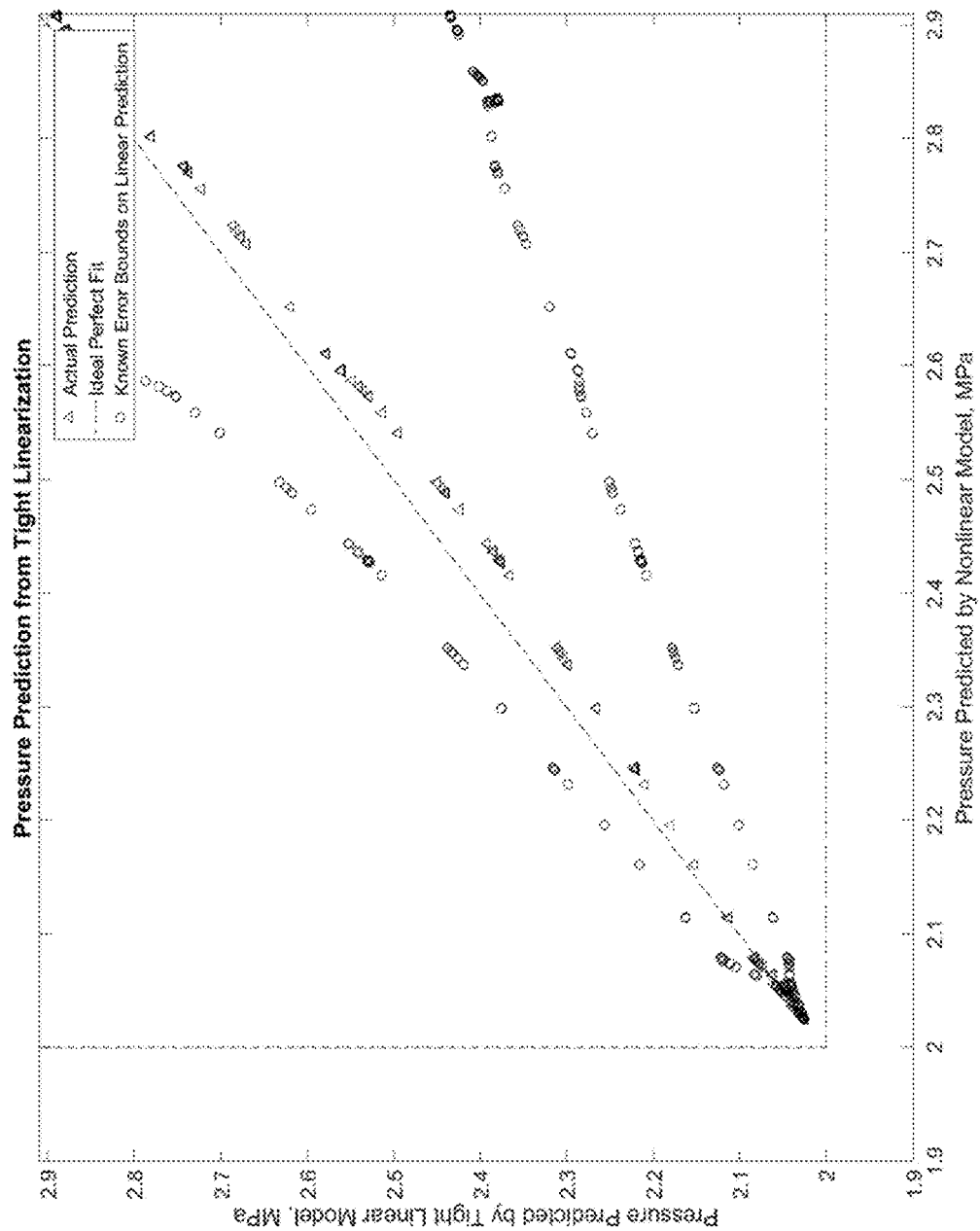
FIG. 26 shows the agreement between the linearized model and the nonlinear model, as well as bounds on the error of the linear model, for example 3.

This example involves a large network that is modeled as having 127 nodes and 200 segments. The methods described above were used to calculate a network flow solution in just under 0.75 seconds. The pressure predictions of the network flow solution, together with the results of the nonlinear model, are shown in FIG. 26. This figure shows that the method produces accurate pressure predictions and a network flow solution that satisfies network pressure constraints.

Figure 27:
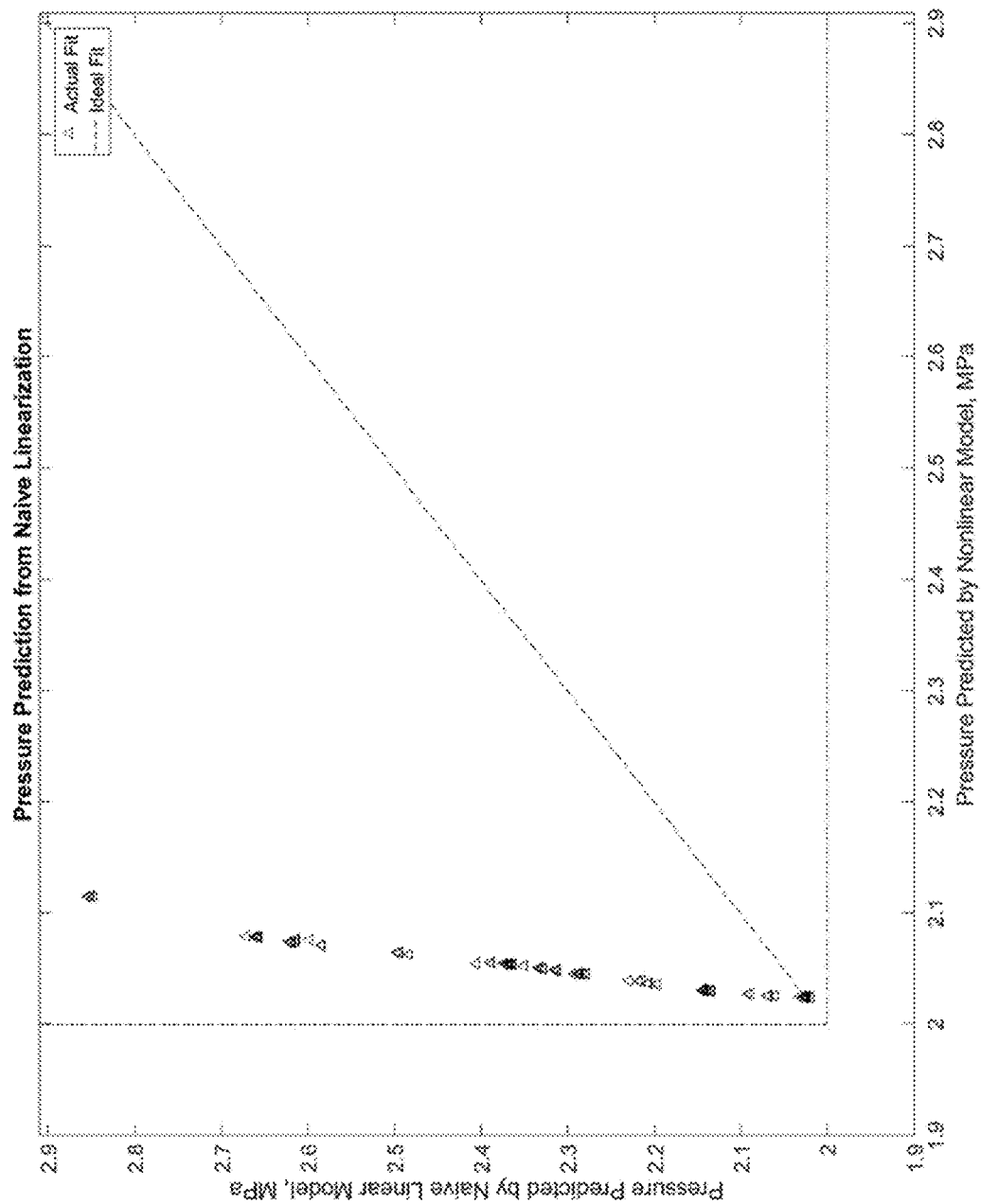
FIG. 27 shows that the pressure predictions resulting from a naïve linearization do not match the pressure estimates produced by a nonlinear model, for example 3.

In contrast, the pressure predictions for a naïve linearization, which are very inaccurate, are shown in FIG. 27.

Example 4

Figure 28:
FIG. 28 is an undirected graph representing the pipeline network for example 4.
Figure 29:
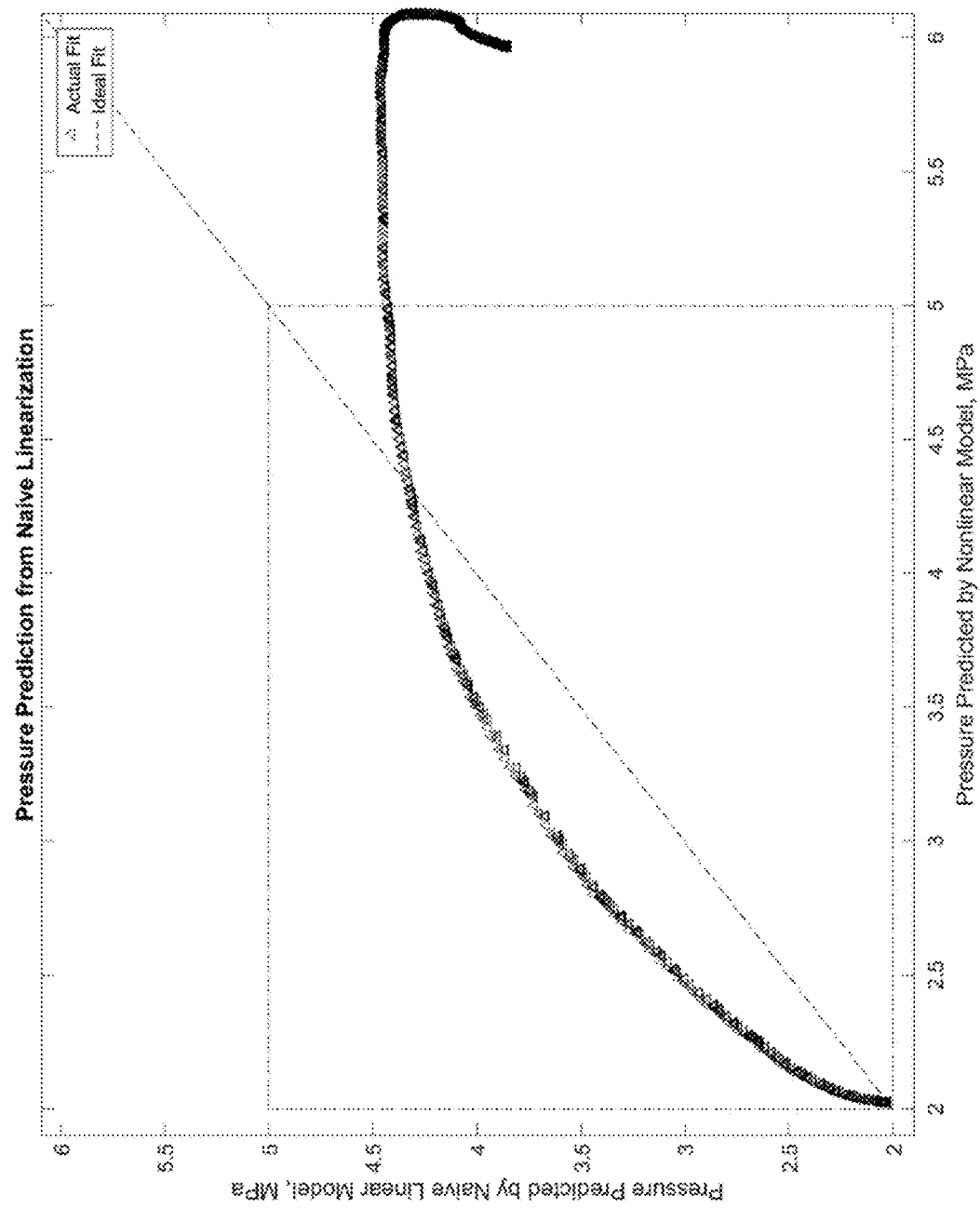
FIG. 29 shows that the flows from a network flow solution produced using a naïve linearization would actually violate pressure bounds when pressures are calculated using the nonlinear model, for example 4.

This example illustrates how an inappropriate linearization can produce flow control solutions that violate pressure constraints. FIG. 28 is an undirected graph representing a large pipeline network. FIG. 29 shows the pressure predictions associated with a network flow solution resulting from a naïve linearization, one in which the flow rates in each pipe segment were not properly bounded prior to producing the linearization. This plot shows that, for all nodes, the pressure prediction of the linear model (on the y-axis) was less than the upper limit of 5 MPa. In contrast, the nonlinear model (on the x-axis), indicates that for the flow rates specified by the network flow solution, node pressures were as high as 6 MPa, much higher than the upper limit of 5 MPa. Thus, if linearization is not done properly, using, for example, the methods of the present invention, the network flow solution may not satisfy pressure constraints.

Example 5

Figure 30:
FIG. 30 is an undirected graph representing the pipeline network of example 5.

The example illustrated in FIG. 30 has a total of 2,953 receipt and delivery points. The elapsed computation time to compute the flow control solution is 37 seconds.

The examples above illustrate that, for even the very large gas pipeline network, the methods of the present invention can be used to quickly calculate network flow solutions which are consistent with meeting pipeline pressure constraints. These network flow solutions can, in turn, be used to provide setpoints for flow control elements which can ensure that the pipeline network is controlled to satisfy pressure constraints while meeting customer demand.

Figure 31:
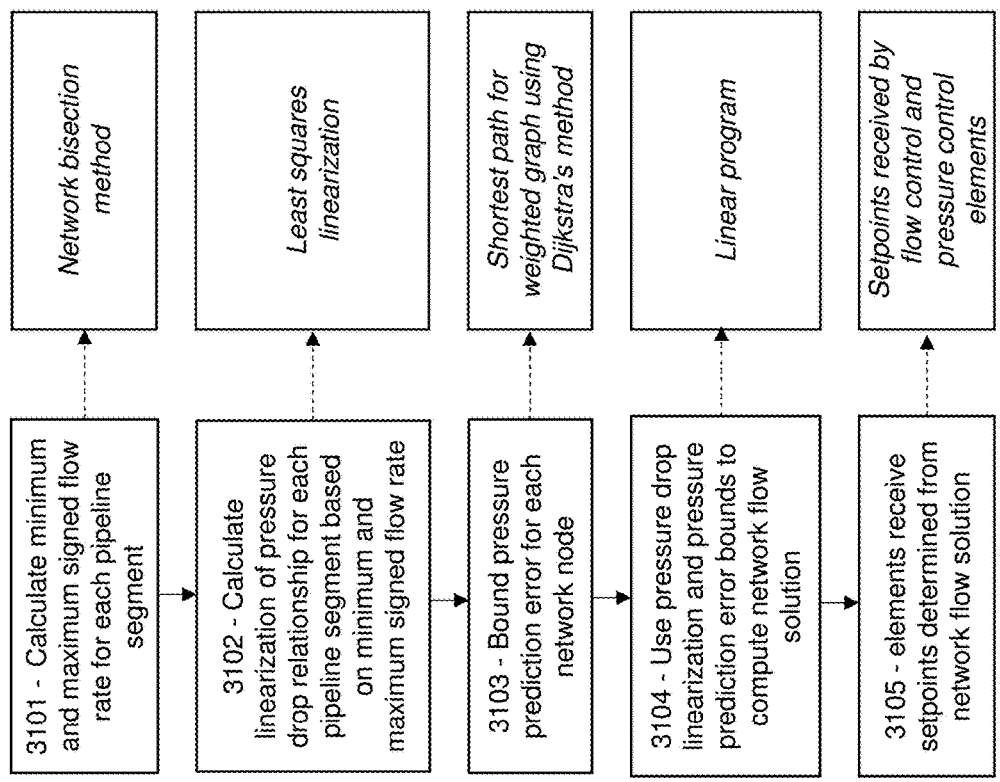
FIG. 31 is a flowchart for a preferred embodiment of the invention.

FIG. 31 is a flow chart illustrating an exemplary method of the present invention. The steps of the method are shown, alongside a preferred means of implementing each step. In step 3101, the minimum and maximum signed flow rate for each pipeline segment is calculated. In preferred embodiments, this is accomplished using the network bisection method. In step 3102, the linearization of pressure drop relationship is calculated for each pipeline segment based on the minimum and maximum signed flow rate. In the preferred embodiments, this is accomplished using the least squares linearization. In step 3103, the pressure prediction error for each network node is bound. In preferred embodiments, this is accomplished using the shortest path for the weighted graph using Dijkstra's method. In step 3104, pressure drop linearization and pressure prediction error bounds are used to compute network flow solution. In preferred embodiments, this is accomplished using linear programming. In step 3105, control elements (e.g., flow control elements and pressure control elements) receive setpoints determined from the network flow solution.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A system for controlling flow of gas in a gas pipeline network comprising:
    a gas pipeline network comprising one or more gas production plants each having a minimum and maximum production rate, one or more gas receipt facilities of a customer each having a demand rate, a plurality of pipeline segments, a plurality of pipeline network nodes, and a plurality of control elements,
    wherein flow of gas within each of the plurality of pipeline segments is associated with a direction, the direction being associated with a positive sign or a negative sign;
    one or more processors configured to:
        calculate a minimum signed flow rate and a maximum signed flow rate for each pipeline segment as a function of the minimum and maximum production rates of the one or more gas production plants and the demand rates of the one or more gas receipt facilities, the minimum signed flow rate constituting a lower bound for flow in each pipeline segment and the maximum signed flow rate constituting an upper bound for flow in each pipeline segment;

linearize a nonlinear pressure drop relationship within the lower bound for the flow and the upper bound for the flow to create a linearized pressure drop model for each pipeline segment; and calculate a network flow solution, using the linear pressure drop model, comprising flow rates for each of the plurality of pipeline segments to satisfy demand constraints and pressures for each of the plurality of network nodes to satisfy pressure constraints, wherein a lower bound pressure constraint comprises a minimum delivery pressure and an upper bound pressure constraint comprises a maximum operating pressure of the pipeline, the network flow solution being associated with control element setpoints; and at least one controller receiving data describing the control element setpoints and controlling at least some of the plurality of control elements using the data describing the control element setpoints;

wherein the linearized pressure drop model for each pipeline segment is a slope-only model having an intercept of zero, if the sign of the minimum signed flow rate is different than the sign of the maximum signed flow rate of the pipeline segment.

2. A system for controlling flow of gas in a gas pipeline network comprising:

a gas pipeline network comprising one or more gas production plants each having a minimum and maximum production rate, one or more gas receipt facilities of a customer each having a demand rate, a plurality of pipeline segments, a plurality of pipeline network nodes, and a plurality of control elements;

wherein flow of gas within each of the plurality of pipeline segments is associated with a direction, the direction being associated with a positive sign or a negative sign;

one or more processors configured to:

calculate a minimum signed flow rate and a maximum signed flow rate for each pipeline segment as a function of the minimum and maximum production rates of the one or more gas production plants and the demand rates of the one or more gas receipt facilities, the minimum signed flow rate constituting a lower bound for flow in each pipeline segment and the maximum signed flow rate constituting an upper bound for flow in each pipeline segment;

linearize a nonlinear pressure drop relationship within the lower bound for the flow and the upper bound for the flow to create a linearized pressure drop model for each pipeline segment; and calculate a network flow solution, using the linear pressure drop model, comprising flow rates for each of the plurality of pipeline segments to satisfy demand constraints and pressures for each of the plurality of network nodes to satisfy pressure constraints, wherein a lower bound pressure constraint comprises a minimum delivery pressure and an upper bound pressure constraint comprises a maximum operating pressure of the pipeline, the network flow solution being associated with control element setpoints; and at least one controller receiving data describing the control element setpoints and controlling at least some of the plurality of control elements using the data describing the control element setpoints;

wherein calculating a network flow solution to satisfy pressure constraints comprises:

bounding a maximum error in pressure drop estimation for one or more of the plurality of pipeline segments as a maximum difference in estimated pressure drop between the linearized pressure drop model and the nonlinear pressure drop relationship;

bounding a maximum error in pressure estimation for a node as a function of the maximum error in pressure drop estimation for the one or more of the plurality of pipeline segments; and using the linearized pressure drop models to calculate a network flow solution such that a node pressure estimate produced by the linearized pressure drop models is less than the upper bound pressure constraint minus the maximum error in pressure estimation and greater than the lower bound pressure constraint plus the maximum error in pressure estimation.

3. The system of claim 2, wherein the maximum error in pressure estimation at a node having a pressure constraint is a sum of the maximum errors in pressure drop estimation for pipeline segments on an acyclic path between a pressure reference node and the node having a pressure constraint.

4. The system of claim 3, wherein the pressure reference node is a node which is incident from a pressure control element arc.

5. The system of claim 4, wherein the acyclic path between the pressure reference node and the node having a pressure constraint is found as a shortest path in a weighted directed graph.

6. The system of claim 5, wherein the shortest path is determined using Dijkstra's algorithm.

* * * * *